US012770223B2

(12) United States Patent
Song et al.

(10) Patent No.: US 12,770,223 B2
(45) Date of Patent: Oct. 20, 2026

(54) SYSTEMS AND METHODS FOR IMAGE COMPOSITING BASED ON A DESCRIPTIVE EMBEDDING

(71) Applicant: ADOBE INC., San Jose, CA (US)

(72) Inventors: Yizhi Song, West Lafayette, IN (US); Zhifei Zhang, San Jose, CA (US); Zhe Lin, Clyde Hill, WA (US); Scott Cohen, Cupertino, CA (US); Brian Lynn Price, Pleasant Grove, UT (US); Jianming Zhang, Fremont, CA (US); Soo Ye Kim, San Jose, CA (US)

(73) Assignee: ADOBE INC., San Jose, CA (US)

( * ) Notice: Subject to any disclaimer, the term of this patent is extended or adjusted under 35 U.S.C. 154(b) by 208 days.

(21) Appl. No.: 18/351,838

(22) Filed: Jul. 13, 2023

(65) Prior Publication Data

US 2025/0022099 A1 Jan. 16, 2025

(51) Int. Cl.

| | |
|---|---|
| ***G09G 5/377*** | (2006.01) |
| ***G06T 1/00*** | (2006.01) |
| ***G06T 5/50*** | (2006.01) |
| ***G06T 5/70*** | (2024.01) |
| ***G06T 9/00*** | (2006.01) |
| ***G06T 11/60*** | (2006.01) |

(52) U.S. Cl.

CPC .............. *G06T 5/50* (2013.01); *G06T 1/0021* (2013.01); *G06T 5/70* (2024.01); *G06T 9/00* (2013.01); *G06T 11/60* (2013.01); *G09G 5/377* (2013.01); *G06T 2207/20081* (2013.01); *G06T 2207/20212* (2013.01); *G06T 2207/20221* (2013.01); *G09G 2340/12* (2013.01)

(58) Field of Classification Search

None

See application file for complete search history.

(56) References Cited

U.S. PATENT DOCUMENTS

| | | | | |
|---|---|---|---|---|
| 2018/0144458 | A1* | 5/2018 | Xu | H04N 13/271 |
| 2019/0377987 | A1* | 12/2019 | Price | G06N 3/045 |
| 2020/0349675 | A1 | 11/2020 | Park et al. | |
| 2020/0380298 | A1* | 12/2020 | Aggarwal | G06F 18/2148 |

(Continued)

OTHER PUBLICATIONS

Li, Kunpeng; Image-Text Embedding Learning via Visual and Textual Semantic Reasoning; Jan. 2023; IEEE Transactions on Pattern Analysis and Machine Intelligence; vol. 45; p. 641-654; https://ieeexplore.ieee.org/stamp/stamp.jsp?tp=&arnumber=9706340 (Year: 2023).*

(Continued)

*Primary Examiner* — Joni Hsu

(74) *Attorney, Agent, or Firm* — F. CHAU & ASSOCIATES, LLC

(57) ABSTRACT

Systems and methods for image compositing are provided. An aspect of the systems and methods includes obtaining a first image and a second image, wherein the first image includes a target location and the second image includes a target element; encoding the second image using an image encoder to obtain an image embedding; generating a descriptive embedding based on the image embedding using an adapter network; and generating a composite image based on the descriptive embedding and the first image using an image generation model, wherein the composite image depicts the target element from the second image at the target location of the first image.

19 Claims, 17 Drawing Sheets

(56) References Cited

U.S. PATENT DOCUMENTS

| | | | | |
|---|---|---|---|---|
| 2021/0142539 | A1* | 5/2021 | Ayush | G06N 3/08 |
| 2022/0101578 | A1* | 3/2022 | Bedi | G06T 11/00 |
| 2023/0005160 | A1 | 1/2023 | Yu et al. | |
| 2023/0214953 | A1* | 7/2023 | Yoo | G06T 1/0028 713/176 |
| 2024/0104698 | A1* | 3/2024 | Nie | G06N 3/044 |
| 2024/0153093 | A1* | 5/2024 | Xu | G06V 20/70 |
| 2024/0177507 | A1* | 5/2024 | Im | G06F 40/40 |
| 2024/0212106 | A1* | 6/2024 | LeGendre | G06T 5/94 |
| 2024/0307783 | A1* | 9/2024 | Menapace | A63F 13/67 |
| 2024/0403362 | A1* | 12/2024 | Kharbanda | G06F 16/71 |
| 2025/0014148 | A1* | 1/2025 | Cho | G06V 10/44 |
| 2025/0175679 | A1 | 5/2025 | Zhang et al. | |
| 2026/0073483 | A1 | 3/2026 | Demochkin et al. | |

OTHER PUBLICATIONS

Zhou, et al., “Deep Single-Image Portrait Relighting”, In ICCV 2019, pp. 7194-7202, 9 pages.
Avrahami, et al., “Blended Diffusion for Text-driven Editing of Natural Images”, In CVPR 2022, 32 pages.
Azadi, et al., “Compositional GAN: Learning Image-Conditional Binary Composition”, arXiv preprint arXiv:1807.07560v3 [cs.CV] Mar. 28, 2019, 15 pages.
Balaji, et al., “eDiff-I: Text-to-Image Diffusion Models with an Ensemble of Expert Denoisers”, arXiv preprint arXiv:2211.01324v5 [cs.CV] Mar. 14, 2023, 24 pages.
Brock, et al., “Large Scale GAN Training for High Fidelity Natural Image Synthesis”, arXiv preprint arXiv:1809.11096v2 [cs.LG] Feb. 25, 2019, 35 pages.
Chen, et al., “Toward Realistic Image Compositing with Adversarial Learning”, In CVPR 2019, pp. 8415-8424, 10 pages.
Cong, et al., “Bargainnet: Background-Guided Domain Translation for Image Harmonization,” arXiv preprint arXiv:2009.09169v2 [cs.CV] Apr. 3, 2021, 12 pages.
Cong, et al., “DoveNet: Deep Image Harmonization via Domain Verification”, In CVPR 2020, pp. 8394-8403, 10 pages.
DeTone, et al., “Deep Image Homography Estimation”, arXiv preprint arXiv:1606.03798v1 [cs.CV] Jun. 13, 2016, 6 pages.
Feng, et al., “ERNIE-ViLG 2.0: Improving Text-to-Image Diffusion Model with Knowledge-Enhanced Mixture-of-Denoising-Experts”, arXiv preprint arXiv:2210.15257v2 [cs.CV] Mar. 28, 2023, 19 pages.
Goodfellow, et al., “Generative Adversarial Nets”, arXiv preprint arXiv:1406.2661v1 [stat.ML] Jun. 10, 2014, 9 pages.
Hessel, et al., “CLIPScore: A Reference-free Evaluation Metric for Image Captioning”, arXiv preprint arXiv:2104.08718v3 [cs.CV] Mar. 23, 2022, 15 pages.
Heusel, et al., “GANs Trained by a Two Time-Scale Update Rule Converge to a Local Nash Equilibrium”, arXiv preprint arXiv:1706.08500v6 [cs.LG] Jan. 12, 2018, 38 pages.
Ho, et al., “Denoising Diffusion Probabilistic Models”, arXiv preprint arXiv:2006.11239v2 [cs.LG] Dec. 16, 2020, 25 pages.
Hold-Geoffroy, et al., “Deep Outdoor Illumination Estimation”, arXiv preprint arXiv:1611.06403v3 [cs.CV] Apr. 11, 2018, 10 pages.
Hong, et al., “Shadow Generation for Composite Image in Real-World Scenes”, arXiv preprint arXiv:2104.10338v3 [cs.CV] May 11, 2022, 16 pages.
Isola, et al., “Image-to-Image Translation with Conditional Adversarial Networks”, arXiv preprint arXiv:1611.07004v3 [cs.CV] Nov. 26, 2018, 17 pages.
Jaderberg, et al., “Spatial Transformer Networks”, arXiv preprint arXiv:1506.02025v3 [cs.CV] Feb. 4, 2016, 15 pages.
Jiang, et al., “SSH: A Self-Supervised Framework for Image Harmonization”, In ICCV 2021, pp. 4832-4841, 10 pages.
Karras, et al., “A Style-Based Generator Architecture for Generative Adversarial Networks”, In CVPR 2019, pp. 4401-4410, 10 pages.
Karsch, et al., “Rendering Synthetic Objects into Legacy Photographs”, arXiv preprint arXiv:1912.11565v1 [cs.GR] Dec. 24, 2019, 12 pages.
Karsch, et al., “Automatic Scene Inference for 3D Object Compositing”, arXiv preprint arXiv:1912.12297v1 [cs.GR] Dec. 24, 2019, 14 pages.
Kawar, et al., “Imagic: Text-Based Real Image Editing with Diffusion Models”, arXiv preprint arXiv:2210.09276v3 [cs.CV] Mar. 20, 2023, 16 pages.
Lalonde, et al., “Using Color Compatibility for Assessing Image Realism”, In 2007 IEEE 11th International Conference on Computer Vision, 2007, 8 pages.
Lee, et al., “Vision Transformer for Small-Size Datasets”, arXiv preprint arXiv:2112.13492v1 [cs.CV] Dec. 27, 2021, 11 pages.
Lee, et al., “CenterMask: Realtime Anchor-Free Instance Segmentation”, In CVPR 2020, pp. 13906-13915, 10 pages.
Li, et al., “BLIP: Bootstrapping Language-Image Pre-Training for Unified Vision-Language Understanding and Generation”, arXiv preprint arXiv:2201.12086v2 [cs.CV] Feb. 15, 2022, 12 pages.
Lin, et al., “ST-GAN: Spatial Transformer Generative Adversarial Networks for Image Compositing”, In CVPR 2018, pp. 9455-9464, 10 pages.
Liu, et al., “ARShadowGAN: Shadow Generative Adversarial Network for Augmented Reality in Single Light Scenes”, in CVPR 2020, pp. 8139-8148, 10 pages.
Liu, et al., “More Control for Free! Image Synthesis with Semantic Diffusion Guidance”, arXiv preprint arXiv:2112.05744v4 [cs.CV] Dec. 5, 2022, 11 pages.
Luo, et al., “Diffusion Probabilistic Models for 3D Point Cloud Generation”, In CVPR 2021, pp. 2837-2845, 9 pages.
Meng, et al., “SDEdit: Image Synthesis and Editing with Stochastic Differential Equations”, arXiv preprint arXiv:2108.01073v2 [cs.CV] Jan. 5, 2022, 33 pages.
Nichol, et al., “GLIDE: Towards Photorealistic Image Generation and Editing with Text-Guided Diffusion Models”, arXiv preprint arXiv:2112.10741v3 [cs.CV] Mar. 8, 2022, 20 pages.
Pérez, et al., “Poisson Image Editing”, in ACM SIGGRAPH 2003 Papers, pp. 313-318, 2003, 6 pages.
Poole, et al., “DreamFusion: Text-to-3D using 2D Diffusion”, arXiv preprint arXiv:2209.14988v1 [cs.CV] Sep. 29, 2022, 18 pages.
Radford, et al., “Learning Transferable Visual Models From Natural Language Supervision”, In Proceedings of the 38th International Conference on Machine Learning, PMLR 139, 2021, 16 pages.
Ramesh, et al., “Zero-Shot Text-to-Image Generation”, In Proceedings of the 37th International Conference on Machine Learning, PMLR 139, 2020, 11 pages.
Rombach, et al., “High-Resolution Image Synthesis with Latent Diffusion Models”, In CVPR 2022, pp. 10684-10695, 12 pages.
Ruiz, et al., “DreamBooth: Fine Tuning Text-to-Image Diffusion Models for Subject-Driven Generation”, arXiv preprint arXiv:2208.12242v2 [cs.CV] Mar. 15, 2023, 25 pages.
Saharia, et al., “Photorealistic Text-to-Image Diffusion Models with Deep Language Understanding”, arXiv preprint arXiv:2205.11487v1 [cs.CV] May 23, 2022, 46 pages.
Schuhmann, et al., “LAION-400M: Open Dataset of CLIP-Filtered 400 Million Image-Text Pairs”, arXiv preprint arXiv:2111.02114v1 [cs.CV] Nov. 3, 2021, 5 pages.
Sheng, et al., “Controllable Shadow Generation Using Pixel Height Maps”, In European Conference on Computer Vision, 2022, 17 pages.
Sheng, et al., “SSN: Soft Shadow Network for Image Compositing”, In CVPR 2021, 11 pages.
Sohl-Dickstein, et al., “Deep Unsupervised Learning using Nonequilibrium Thermodynamics”, In Proceedings of the 32nd International Conference on Machine Learning, JMLR: W&CP vol. 37, 2015, 10 pages.
Song, et al., “Generative Modeling by Estimating Gradients of the Data Distribution”, In 33rd Conference on Neural Information Processing Systems (NeurIPS 2019), 13 pages.
Sunkavalli, et al., “Multi-Scale Image Harmonization”, In ACM Transactions on Graphics (Proc. ACM SIGGRAPH), 2010, 10 pages.

(56) References Cited

OTHER PUBLICATIONS

Tsai, et al., "Deep Image Harmonization", In CVPR 2017, pp. 3789-3797, 9 pages.
Vaswani, et al., "Attention Is All You Need", In 31st Conference on Neural Information Processing Systems (NIPS 2017), 11 pages.
Xu, et al., "Deep Image Matting", In CVPR 2017, pp. 2970-2979, 10 pages.
Xue, et al., "DCCF: Deep Comprehensible Color Filter Learning Framework for High-Resolution Image Harmonization", arXiv preprint arXiv:2207.04788v3 [cs.CV] Jul. 20, 2022, 27 pages.
Zhang, et al., "The Unreasonable Effectiveness of Deep Features as a Perceptual Metric", In CVPR 2018, pp. 586-595, 10 pages.
Office Action dated Mar. 25, 2026 in related U.S. Appl. No. 18/821,013.

* cited by examiner

1500

SYSTEMS AND METHODS FOR IMAGE COMPOSITING BASED ON A DESCRIPTIVE EMBEDDING

BACKGROUND

The following relates generally to machine learning, and more specifically to machine learning for image generation. Machine learning is an information processing field in which algorithms or models such as artificial neural networks are trained to make predictive outputs in response to input data without being specifically programmed to do so. For example, a machine learning model can be used to generate an image based on input data, where the image is a prediction of what the machine learning model thinks the input data describes.

Machine learning techniques can be used to generate images according to multiple modalities. For example, a machine learning model can be trained to generate an image based on a text input or an image input, such that the content of the image is determined based on information included in the text input or the image input.

SUMMARY

Aspects of the present disclosure provide systems and methods for image compositing. According to an aspect of the present disclosure, an image generation system obtains an input pair of images in which the first image includes a target location for inserting an object depicted in the second image. The image generation system generates an image embedding for the second image and generates a descriptive embedding based on the image embedding using an adapter network. The image generation system generates a composite image based on the first image and the descriptive embedding, where the composite image depicts the first image with the object depicted in the second image inserted into the target location.

According to some aspects, the descriptive embedding encodes the precise content of the second image in a format that is more readily usable as a conditioning input by the image generation model than the image embedding would be. Furthermore, the descriptive embedding provides more information to the image generation model about the second image than a text embedding of a text description of the second image could provide.

Accordingly, because the image generation model generates the composite image based on the descriptive embedding, the composite image includes a more realistic composition of the first image and the object of the second image than conventional image generation systems and methods can provide.

A method, apparatus, non-transitory computer readable medium, and system for image generation are described. One or more aspects of the method, apparatus, non-transitory computer readable medium, and system include obtaining a first image and a second image, wherein the first image includes a target location and the second image includes a target element; encoding the second image using an image encoder to obtain an image embedding; generating a descriptive embedding based on the image embedding using an adapter network; and generating a composite image based on the descriptive embedding and the first image using an image generation model, wherein the composite image depicts the target element from the second image at the target location of the first image.

A method, apparatus, non-transitory computer readable medium, and system for image generation are described. One or more aspects of the method, apparatus, non-transitory computer readable medium, and system include obtaining training data including an image embedding for a training image and a text embedding for a caption describing the training image and training, using the training data, an adapter network of a machine learning model to generate a descriptive embedding of the training image based on the image embedding.

An apparatus and system for image generation are described. One or more aspects of the apparatus and system include one or more processors; one or more memory components coupled with the one or more processors; an adapter network trained to generate a descriptive embedding based on an image; and an image generation model trained to generate a composite image based on the descriptive embedding and an additional image.

DETAILED DESCRIPTION

Figure 1:
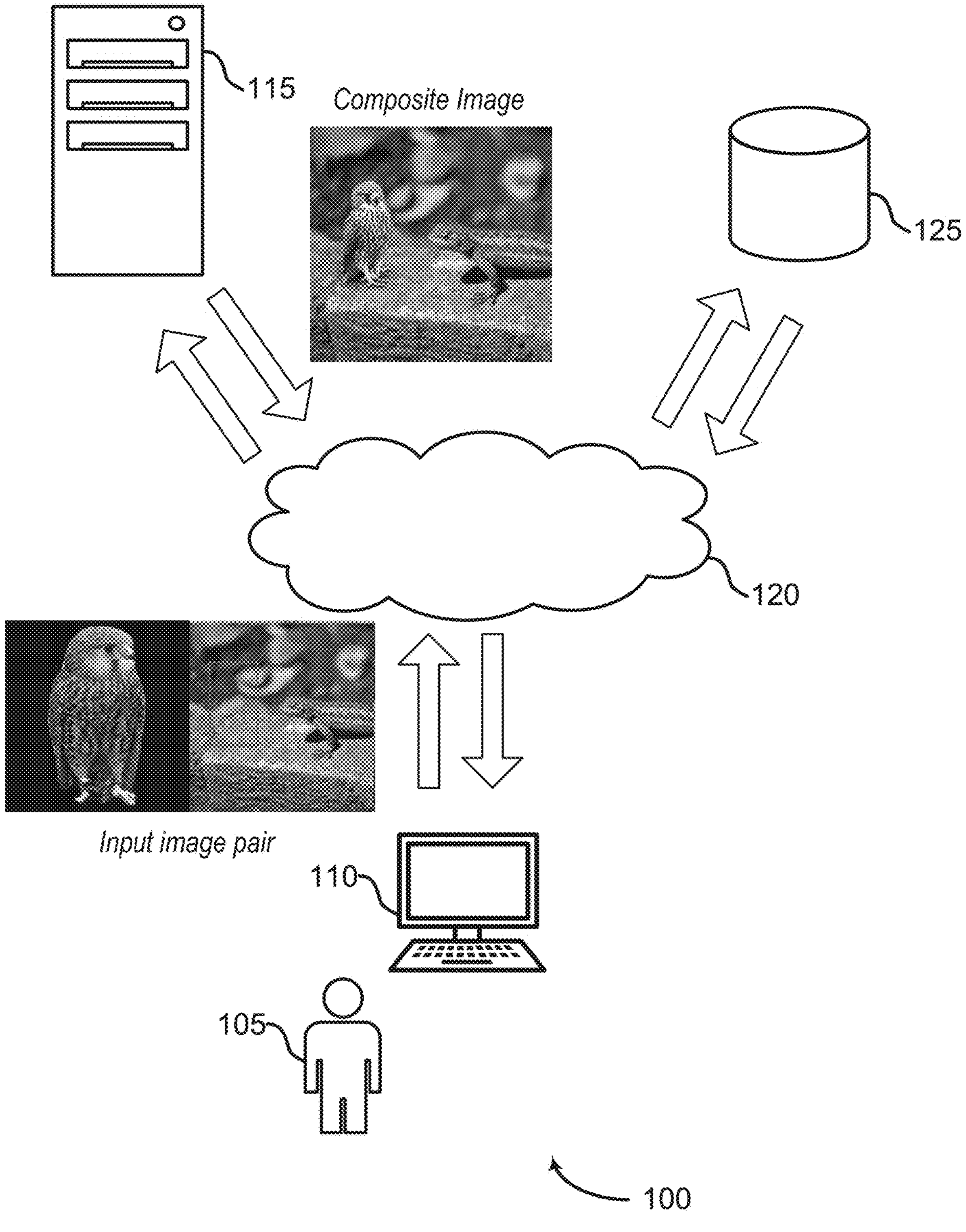
FIG. 1 shows an example of an image generation system according to aspects of the present disclosure.

Machine learning techniques can be used to generate images according to multiple modalities. For example, a machine learning model can be trained to generate an image based on a text input or an image input, such that the content of the image is determined based on information included in the text input or the image input.

Image compositing is an image generation sub-field in which an object depicted in an image is inserted into another image (in many cases, with a goal of creating a new image that realistically incorporates the object with the other image). Conventional image generation techniques can employ many sub-processes (such as geometric correction, image harmonization, image matting, color harmonization, relighting, and shadow generation) to generate a composite image that naturally blends the object into the other image. Most conventional image generation techniques focus on a single image compositing sub-task, and therefore must be appropriately combined to obtain a composite image in which the object is re-synthesized to include, for example, a color, lighting, and a shadow that is consistent with the other image.

Some conventional image generation systems instead employ machine learning techniques to perform image compositing tasks, which can be more efficient, less time-consuming, less laborious, and less skill-intensive than manual image compositing (such as cut-and-pasting using image editing software), and in some cases can produce a composite image that more realistically incorporates the object with the other image than a manually composited image can.

For example, some conventional machine learning models employ a generative adversarial network (GAN) to correct geometric inconsistencies between a furniture object and an indoor background scene, binary composition using a composition-decomposition network to capture interactions between a pair of objects, deep neural networks to perform image harmonization, or shadow mask generation-and-filling or ambient occlusion for shadow generation. An example comparative image generation system uses a comparative machine learning model to attempt to simultaneously perform several image-compositing sub-tasks based on a mask input; however, a pose of an object generated by the comparative machine learning model is constrained by the mask, and the comparative machine learning model cannot generalize to non-rigid objects (such as animals).

Diffusion models are a family of deep generative models that can learn to recover data from noise that has been added to an image, thereby generating a new image. Conventional diffusion model-based image generation systems are versatile and outperform various prior methods in image editing and other applications.

Specifically, guided diffusion models can be guided or conditioned according to a guidance prompt (such as a text prompt, an image prompt, etc.) to output an image that depicts a characteristic described by the guidance prompt. In an image editing context, most conventional guided diffusion models focus on using a text prompt describing an object to be added to an image as guidance, as conventional guided diffusion models tend to achieve more realistic and/or visually appealing results when guided by a text prompt rather than an image prompt, or need to use multiple images of a same object to generate an image embedding that includes a sufficient amount of information for the object.

Some conventional diffusion models apply a diffusion model in a latent space. Examples of conventional diffusion models fuse noised versions of an input with a local text-guided diffusion latent, handle text-guided inpainting after fine-tuning, allow stroke painting in images, or inject semantic diffusion guidance at each iteration of the image generation process according to multi-modal guidance.

However, a text prompt is insufficient guidance for image compositing, as a textual representation of an object depicted in an image cannot fully capture the details of the depiction or preserve the identity and appearance of the object in the image.

Aspects of the present disclosure provide systems and methods for image compositing. According to an aspect of the present disclosure, an image generation system obtains an input pair of images in which the first image includes a target location for inserting an element depicted in the second image. The image generation system generates an image embedding for the second image and generates a descriptive embedding for the image embedding using an adapter network. The image generation system generates a composite image based on the first image and the descriptive embedding, where the composite image depicts the first image with the element depicted in the second image inserted into the target location.

According to some aspects, the descriptive embedding encodes information of the second image in a modality similar to a text modality that is more readily understood by the image generation model than an image modality for the image embedding would be. Furthermore, the descriptive embedding provides more information about the second image than a text embedding of a text description of the second image could provide.

Accordingly, because the image generation model generates the composite image based on the descriptive embedding, the composite image includes a more realistic composition of the first image and the element of the second image than conventional machine learning image generation systems and methods can provide.

An example of the present disclosure is used in an image compositing context. For example, a user wants to insert a target element of a second image (e.g., a bird) into a first image (e.g., an image of a lizard sitting on a brick). In some cases, the user provides the first image, an image including the target element, and an identification of a target location for inserting the element into the first image to an image generation system according to an aspect of the present disclosure.

In some cases, the image generation system extracts the target element from the image including the target element, where the image including the target element also depicts other elements, to obtain a second image. In some cases, the image generation system extracts the target element in response to a user identification of the target element (provided, for example, via a graphical user interface provided by the image generation system on a user device). In some cases, the image including the target element does not depict another element, and the image including the target element is a second image. In some cases, the image generation system identifies the target location based on, for example, an analysis of the first image, in response to a user identification of the target location via the graphical user interface, or by being provided with the target location in the first image.

In some cases, the image generation system encodes the second image to obtain an image embedding and provides the image embedding to an adapter network. In some cases, the adapter network modifies the dimensions of the image embedding to match dimensions of a text embedding and translates the image embedding from an image modality to a text modality to obtain a descriptive embedding.

In some cases, the image generation system adds noise to the target location of the first image and gradually denoises the noised region while guided by the descriptive embedding to obtain a composite image that depicts the target element at the target location of the first image. In some cases, the image generation system provides the composite image to the user (for example, via the graphical user interface).

Further example applications of the present disclosure in the image compositing context are provided with reference to FIGS. 1-4. Details regarding the architecture of the image generation system are provided with reference to FIGS. 1-8 and 17. Examples of a process for image generation are provided with reference to FIGS. 9-10. Examples of a process for training a machine learning model are provided with reference to FIGS. 11-16.

According to some aspects, an image generation apparatus uses a machine learning model to synthesize (e.g., generate) a composite image based on an element depicted in a second image (e.g., a source object), a first image (e.g., a target background image), and a target location of the first image (e.g., a bounding box specifying a location in the first image to insert the source object). In some cases, the machine learning model includes an adapter network and an image generation model (e.g., a diffusion model). In some cases, the adaptor network is trained to extract a descriptive embedding (e.g., a multi-modal representation) of the element from the second image that comprises both high-level semantics and low-level details, such as color and shape.

In some cases, the image generation apparatus leverages the image generation model to simultaneously handle multiple aspects of image compositing (such as viewpoint, color harmonization, lighting, geometry correction, and shadow generation).

In some cases, by generating the composite image based on the descriptive embedding, the image generation model accordingly preserves an identity and appearance of both elements of the first image (e.g., the background scene) and of the element of the second image while increasing a generation quality and versatility of the composite image.

According to some aspects, the machine learning model is trained in a self-supervised manner from which task-specific labeling may be omitted. In some cases, various data augmentation techniques are applied to training data for the machine learning model to further increase a fidelity and realism of a composite image output by the machine learning model.

According to some aspects, the image generation system therefore handles image composition in a unified manner, generating a foreground object that is harmonious and geometrically consistent with a background while synthesizing new views and shadows. Furthermore, according to some aspects, one or more characteristics of an original object are preserved in the composite image.

Image Generation System

A system and an apparatus for image generation are described with reference to FIGS. 1-8 and 17. One or more aspects of the system and the apparatus include one or more processors; one or more memory components coupled with the one or more processors; an adapter network trained to generate a descriptive embedding based on an image; and an image generation model trained to generate a composite image based on the descriptive embedding and an additional image.

In some aspects, the adapter network comprises a convolutional layer, an attention block, and a multilayer perceptron. In some aspects, the image generation model comprises a diffusion model that is conditioned on the descriptive embedding.

Some examples of the system and the apparatus further include an image encoder trained to generate an image embedding of the image, wherein the adapter network is trained to generate the descriptive embedding based on the image embedding.

FIG. 1 shows an example of an image generation system 100 according to aspects of the present disclosure. The example shown includes user 105, user device 110, image generation apparatus 115, cloud 120, and database 125.

Referring to FIG. 1, user 105 provides an input image pair to image generation apparatus 115 via user device 110. For example, in some cases, image generation apparatus 115 provides a user interface (such as a graphical user interface) on user device 110, and user 105 provides the input image pair via the user interface.

In some cases, the input image pair includes a first image indicating a target location for inserting a target element and a second image including the target element. In the example of FIG. 1, the first image depicts a lizard on a brick and a rectangular target location and the second image depicts a bird (e.g., the target element).

In some cases, image generation apparatus 115 uses a machine learning model to generate a composite image based on the first image and a descriptive embedding of the second image. In some cases, the composite image includes a depiction of the target element at the target location of the first image. In some cases, the composite image includes the elements of the first image that are disposed outside of the target location. In some cases, the target location includes additional elements, such as a shadow for the element of the second image and one or more elements determined by the machine learning model based on one or more of the first image and the second image.

In some cases, the descriptive embedding allows the machine learning model to preserve characteristics of the target element that provide a visual identity of the target element while manipulating and/or adding other characteristics (such as a shape, a size, an orientation, a shadow, lighting, etc.) that enable the target element to be composited with the first image in a visually harmonious and realistic manner.

In the example of FIG. 1, the composite image depicts the bird of the second image composited with the first image at the target location of the first image. The depiction of the bird in the composite image is not visually identical to the depiction of the bird in the second image, due to changes in a spatial orientation and lighting of the bird, but both depictions are recognizably depictions of a same bird (e.g., the composite image preserves identity characteristics of the bird depicted in the second image). Furthermore, in the example of FIG. 1, the machine learning model has generated a realistic shadow for the bird, and the machine learning model has generated elements in the target location based on the rest of the first image (such as a continuation of the brick).

In some cases, image generation apparatus 115 provides the composite image to user 105 (for example, via the user device provided on user device 110).

As used herein, a "target location" can refer to an area of an image (e.g., a target image) that is provided as input to an image generation model, where the target location designates an area for depicting a target element of another image.

As used herein, an element of an image can refer to an entity (such as an object), a portion of an entity, a background (such as a landscape, a sky, etc.), a portion of a background, or any other identifiable thing or portion of a thing depicted in the image. As used herein, a "target element" can refer to an element that is intended to be depicted in a composite image in an area corresponding to a target location of another image (e.g., at the target location).

As used herein, a "composite image" can refer to an image generated by an image generation model that combines respective elements from two or more images. In some cases, a composite image includes one or more of a depiction of each element included in a first image that is located outside of a target area of the first image, a depiction (in an area of the composite image corresponding to the target location) of a target element included in a second image, a depiction (in the area of the composite image corresponding to the target location) of one or more elements of the first image included in the target area of the first image, and one or more other elements (such as one or more of a shadow, new lighting effects, etc.) that the image generation model predicts will help to visually incorporate the element of the second image with the first image.

In some cases, the composite image can be considered to be the image generation model's prediction, based on the target image including the target location and the descriptive embedding of the target element, of what a realistic depiction of a combination of the target image and the target element would be.

As used herein, an "embedding" refers to a mathematical representation of an object (such as text, an image, audio, etc.) in a lower-dimensional space, such that information about the object can be more easily captured and analyzed by a machine learning model. For example, an embedding can be a numerical representation of the object in a continuous vector space in which objects that have similar semantic information correspond to vectors that are numerically similar to and thus "closer" to each other, providing for an ability of a machine learning model to effectively compare the objects corresponding to the embeddings with each other.

An embedding can be produced in a "modality" (such as a text modality, an image modality, an audio modality, etc.) that corresponds to a modality of the corresponding object. In some cases, embeddings in different modalities include different dimensions and characteristics, which makes a direct comparison of embeddings from different modalities difficult. In some cases, an embedding for an object can be generated or translated into a multi-modal embedding space, such that objects from multiple modalities can be effectively compared with each other.

As used herein, in some cases, a "descriptive embedding" refers to a translation of an image embedding into a multi-modal or text embedding space, such that the descriptive embedding includes information from an image modality with one or more dimensions and/or characteristics associated with a text embedding. In some cases, a descriptive embedding can therefore effectively substitute for a text embedding as guidance for a reverse diffusion process of a diffusion model.

According to some aspects, user device 110 is a personal computer, laptop computer, mainframe computer, palmtop computer, personal assistant, mobile device, or any other suitable processing apparatus. In some examples, user device 110 includes software that displays a user interface (e.g., a graphical user interface) provided by image generation apparatus 115. In some aspects, the user interface allows information (such as an image, a prompt, etc.) to be communicated between user 105 and image generation apparatus 115.

According to some aspects, a user device user interface enables user 105 to interact with user device 110. In some embodiments, the user device user interface may include an audio device, such as an external speaker system, an external display device such as a display screen, or an input device (e.g., a remote-control device interfaced with the user interface directly or through an I/O controller module). In some cases, the user device user interface may be a graphical user interface.

Image generation apparatus 115 is an example of, or includes aspects of, the corresponding element described with reference to FIGS. 5, 8, and 12. According to some aspects, image generation apparatus 115 includes a computer-implemented network. In some embodiments, the computer-implemented network includes a machine learning model (such as the machine learning model described with reference to FIG. 5). In some embodiments, image generation apparatus 115 also includes one or more processors, a memory subsystem, a communication interface, an I/O interface, one or more user interface components, and a bus as described with reference to FIG. 17. Additionally, in some embodiments, image generation apparatus 115 communicates with user device 110 and database 125 via cloud 120.

In some cases, image generation apparatus 115 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Further detail regarding the architecture of image generation apparatus 115 is provided with reference to FIGS. 5-8 and 17. Further detail regarding a process for image generation is provided with reference to FIGS. 9-10. Further detail regarding a process for training a machine learning model is provided with reference to FIGS. 11-16.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet.

Some large cloud networks have functions distributed over multiple locations from central servers. A server is designated an edge server if it has a direct or close connection to a user. In some cases, cloud 120 is limited to a single organization. In other examples, cloud 120 is available to many organizations.

In one example, cloud 120 includes a multi-layer communications network comprising multiple edge routers and core routers. In another example, cloud 120 is based on a local collection of switches in a single physical location. According to some aspects, cloud 120 provides communications between user device 110, image generation apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to image generation apparatus 115 and communicates with image generation apparatus 115 via cloud 120. According to some aspects, database 125 is included in image generation apparatus 115.

Figure 2:
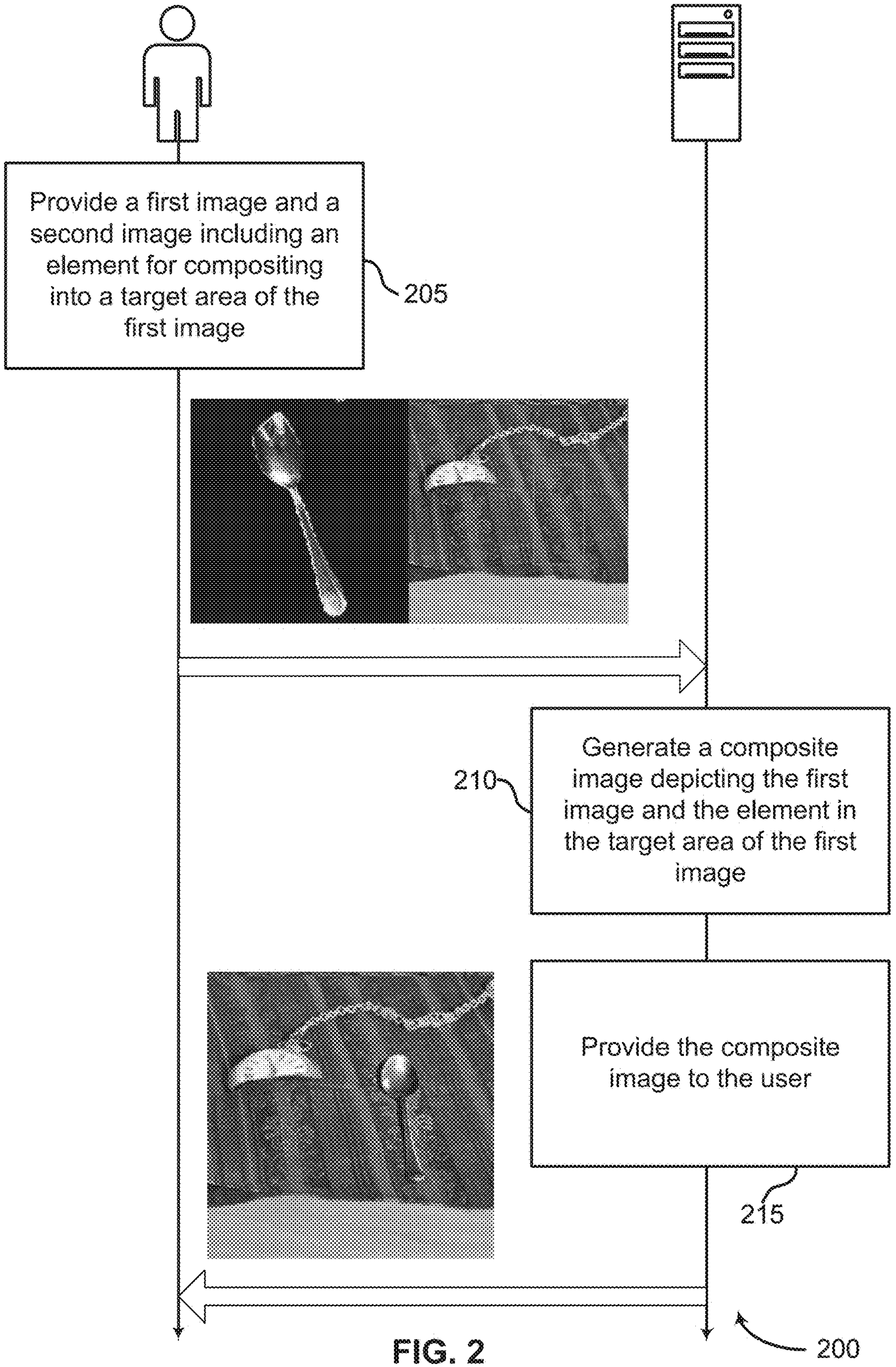
FIG. 2 shows an example of a method for image compositing according to aspects of the present disclosure.

FIG. 2 shows an example of a method 200 for image compositing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, an image generation system (such as the image generation system described with reference to FIG. 1) generates a composite image depicting an object composited with elements of a target image.

At operation 205, a user provides a first image and a second image including an element for compositing into a target area of the first image. In some cases, the operations of this step refer to, or may be performed by, a user as described with reference to FIG. 1.

For example, in some cases, the user provides a target image including a target location and a second image including a target element to an image generation apparatus of the image generation system (such as the image generation apparatus described with reference to FIGS. 1, 5, 8, and 12). In some cases, the user provides the target image and the second image to the image generation apparatus via a graphical user interface provided by the image generation apparatus on a user device (such as the user device described with reference to FIG. 1).

In the example of FIG. 2, the first image (e.g., the target image) includes the target area (e.g., the target location) as a bounded rectangular area and depicts a broken pocket watch resting on patterned fabric. The second image includes the element for compositing into the target area (e.g., a target element, a metal spoon). In the example of FIG. 2, the second image only depicts the target element and does not include a depiction of another element.

At operation 210, the system generates a composite image depicting the first image and the element in the target area of the first image. In some cases, the operations of this step refer to, or may be performed by, an image generation apparatus as described with reference to FIGS. 1, 5, 8, and 12.

For example, in some cases, the image generation apparatus generates the composite image as described with reference to FIGS. 9-10. In the example of FIG. 2, the composite image includes a depiction of the content of the target image as well as a depiction of the metal spoon in an area corresponding to the target area of the target image. The depictions of the metal spoon in the second image and in the composite image are not identical, but the visual identity of the metal spoon is maintained in the composite image.

At operation 215, the system provides the composite image to the user. In some cases, the operations of this step refer to, or may be performed by, an image generation apparatus as described with reference to FIGS. 1, 5, 8, and 12. For example, in some cases, the image generation apparatus provides the composite image to the user via the graphical user interface provided on the user device.

Figure 3:
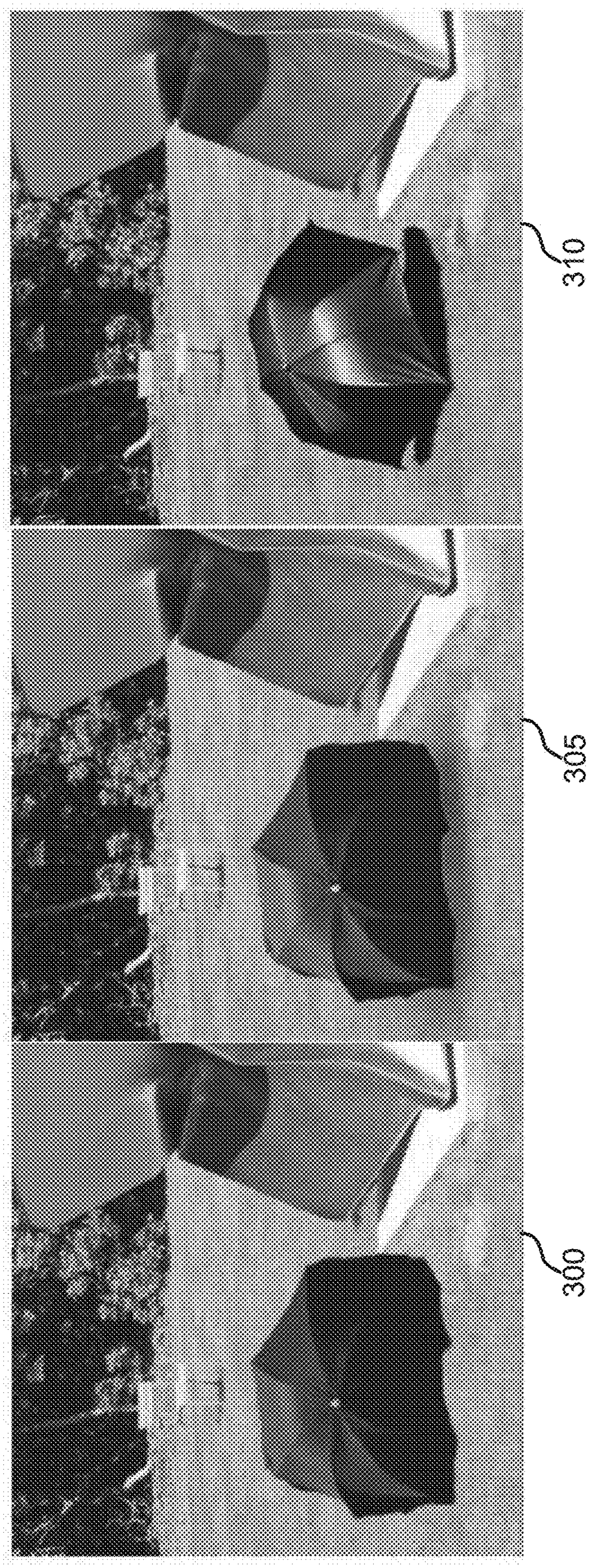
FIG. 3 shows an example of a comparison of composite images.

FIG. 3 shows an example of a comparison of composite images. The example shown includes first comparative composite image 300, second comparative composite image 305, and composite image 310. Composite image 310 is an example of, or includes aspects of, the corresponding element described with reference to FIG. 4.

Referring to FIG. 3, first comparative composite image 300 is an example of a composite image produced by a conventional cut-and-paste method in which an umbrella is inserted into a background image. First comparative composite image 300 includes a shadow below the pasted umbrella object, but the shadow is not realistic, and first comparative composite image 300 does not otherwise depict a realistic integration of the umbrella with the background. For example, first comparative composite image 300 does not depict realistic lighting for the umbrella, and the "view" of the umbrella as depicted in the image it was extracted from has not been changed to match the perspective of the background.

Second comparative composite image 305 is an example of a composite image produced by a conventional pipeline of conventional image generation models variously performing foreground/background color harmonization, Poisson blending, and shadow synthesis. However, like first comparative composite image 300, second comparative composite image 305 does not realistically integrate the umbrella with the background.

Composite image 310 is an example of a composite image generated by an image generation model (such as the image generation model described with reference to FIGS. 5 and 8) according to the present disclosure. Compared to first comparative composite image 300 and second comparative composite image 305, composite image 310 includes a realistic combined depiction of the umbrella and the background, including a realistic shadow for the umbrella.

Other notable differences between composite image 310 and both of first comparative composite image 300 and second comparative composite image 305 include the depiction of realistic lighting for the umbrella in composite image 310 as well as a realistic spatial/geometric orientation of the umbrella with respect to the perspective of the background in composite image 310, demonstrating that the image generation model learns to generate composite images based on an understanding of a spatial orientation of a target element with respect to a target location as well as an understanding of a light source for the target image.

Figure 4:
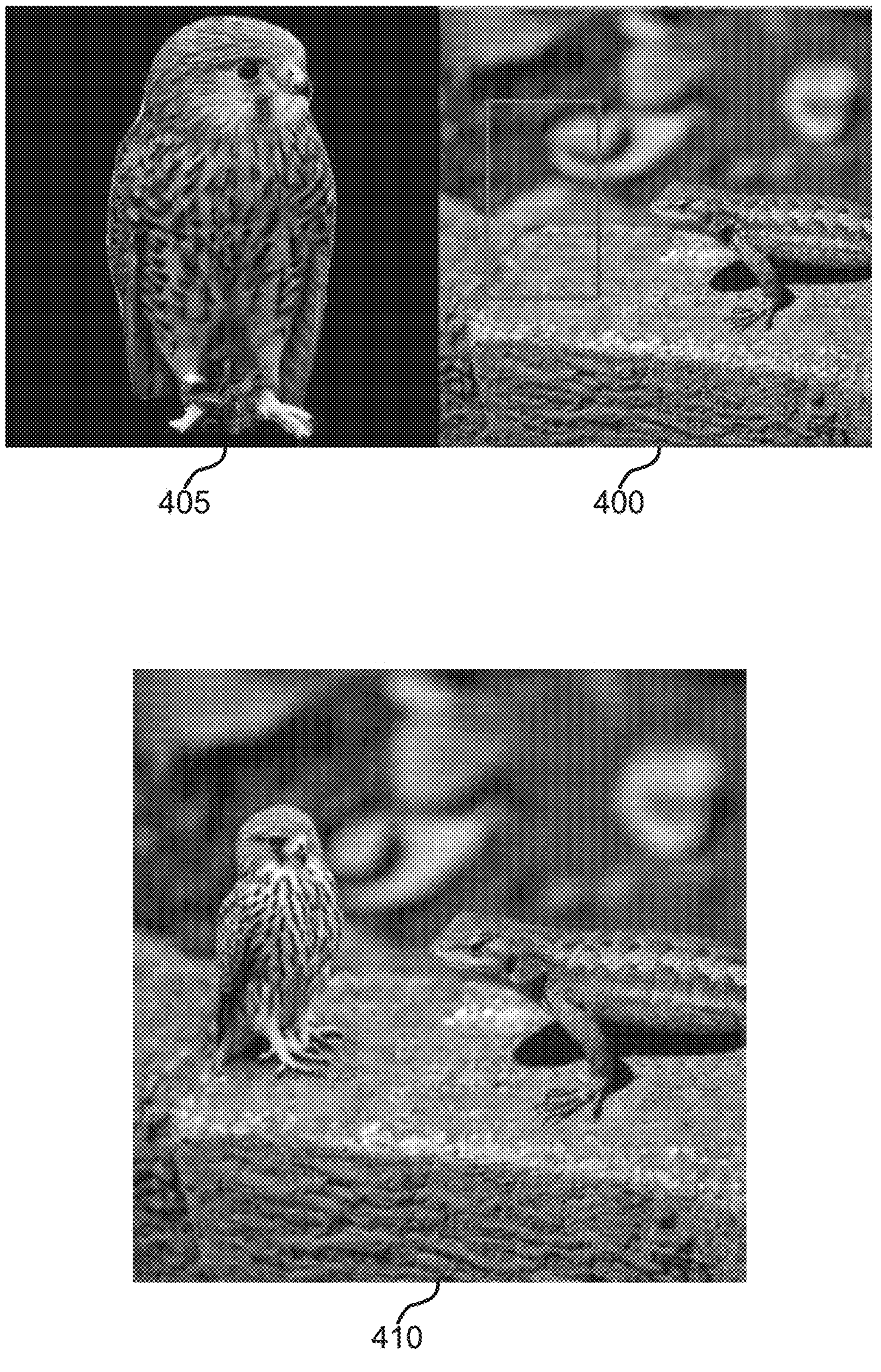
FIG. 4 shows an example of a composite image according to aspects of the present disclosure.

FIG. 4 shows an example of a composite image 410 according to aspects of the present disclosure. The example shown includes first image 400, second image 405, and composite image 410. Second image 405 is an example of, or includes aspects of, the corresponding element described with reference to FIG. 8. Composite image 410 is an example of, or includes aspects of, the corresponding element described with reference to FIG. 3.

FIG. 4 includes enlarged versions of the input image pair and composite image shown in FIG. 1. As noted above with respect to FIG. 1, composite image 410 depicts the bird of second image 405 composited with first image 400 in a target location of first image 400 delineated by a rectangular border. The depiction of the bird in composite image 410 is not visually identical to the depiction of the bird in second image 405, due to changes in a spatial orientation and lighting of the bird, but both depictions are recognizably depictions of a same bird (e.g., composite image 410 preserves the identity characteristics of the bird in a generated depiction of the bird in composite image 410). Furthermore, in the example of FIG. 1, the machine learning model has generated a realistic shadow for the bird, and the machine learning model has generated elements in the target location based on the rest of first image 400 (such as a continuation of the brick).

Therefore, in some cases, an image generation system according to an aspect of the present disclosure achieves more realistic results than conventional image generation systems and addresses one or more of geometry correction, harmonization, shadow generation, and view synthesis of a composited image while preserving a similar appearance of a composited object to a reference object.

Figure 5:
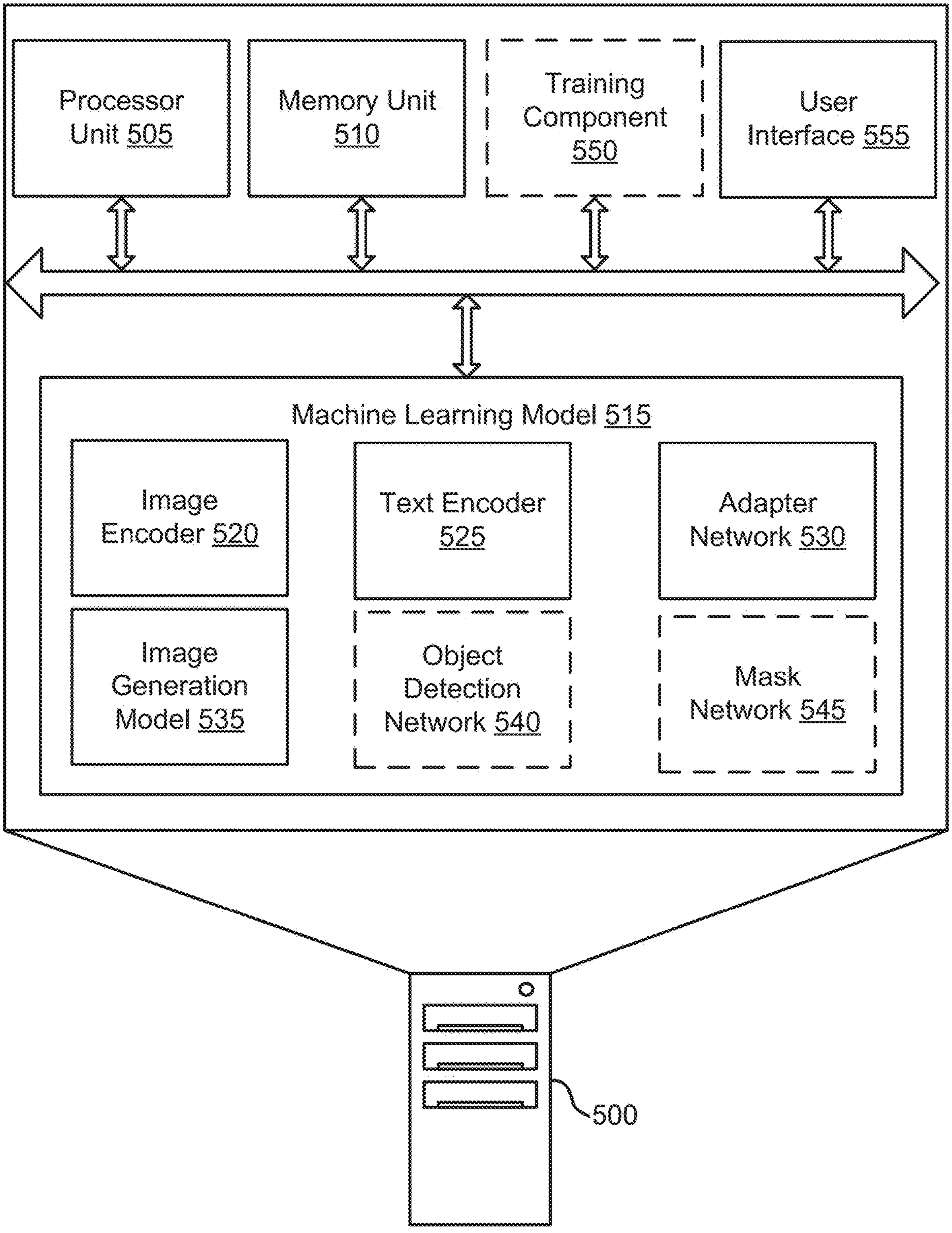
FIG. 5 shows an example of an image generation apparatus according to aspects of the present disclosure.

FIG. 5 shows an example of an image generation apparatus 500 according to aspects of the present disclosure. Image generation apparatus 500 is an example of, or includes aspects of, the corresponding element described with reference to FIGS. 1, 8, and 12. According to some aspects, image generation apparatus 500 includes processor unit 505, memory unit 510, machine learning model 515, training component 550, and user interface 555.

Processor unit 505 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 505 is configured to operate a memory array using a memory controller. In other cases, a memory controller is integrated into processor unit 505. In some cases, processor unit 505 is configured to execute computer-readable instructions stored in memory unit 510 to perform various functions. In some aspects, processor unit 505 includes special purpose components for modem processing, baseband processing, digital signal processing, or transmission processing. According to some aspects, processor unit 505 comprises the one or more processors described with reference to FIG. 17.

Memory unit 510 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 505 to perform various functions described herein.

In some cases, memory unit 510 includes a basic input/output system (BIOS) that controls basic hardware or software operations, such as an interaction with peripheral components or devices. In some cases, memory unit 510 includes a memory controller that operates memory cells of memory unit 510. For example, the memory controller may include a row decoder, column decoder, or both. In some cases, memory cells within memory unit 510 store information in the form of a logical state. According to some aspects, memory unit 510 comprises the memory subsystem described with reference to FIG. 17.

According to some aspects, image generation apparatus 500 uses at least one processor included in processor unit 505 to execute instructions stored in at least one memory device included in memory unit 510 to perform operations.

For example, according to some aspects, image generation apparatus 500 obtains a first image and a second image, where the first image includes a target location and the second image includes a target element. In some examples, image generation apparatus 500 obtains a mask indicating the target location of the first image, where a composite image is generated based on the mask. In some examples, image generation apparatus 500 adds noise to the first image at the target location indicated by the mask. In some examples, image generation apparatus 500 provides a descriptive embedding of the second image as guidance to image generation model 535 for generating the composite image. In some aspects, the descriptive embedding includes a same number of dimensions as a text embedding used to train the image generation model.

According to some aspects, machine learning model 515 includes image encoder 520, text encoder 525, adapter network 530, image generation model 535, object detection network 540, and mask network 545.

According to some aspects, machine learning model 515 comprises machine learning parameters stored in memory unit 510. Machine learning parameters are variables that provide a behavior and characteristics of a machine learning model. Machine learning parameters can be learned or estimated from training data and are used to make predictions or perform tasks based on learned patterns and relationships in the data.

Machine learning parameters may be adjusted during a training process to minimize a loss function or to maximize a performance metric. The goal of the training process is to find optimal values for the parameters that allow the machine learning model to make accurate predictions or perform well on a given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

Parameters of an artificial neural network (ANN) can include weights and biases associated with each neuron in the ANN that can control a strength of connections between neurons and influence the ability of the ANN to capture complex patterns in data.

According to some aspects, machine learning model 515 is implemented as software stored in memory unit 510 and executable by processor unit 505, as firmware, as one or more hardware circuits, or as a combination thereof.

According to some aspects, machine learning model 515 comprises one or more ANNs. An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Image encoder 520 is an example of, or includes aspects of, the corresponding element described with reference to FIGS. 8 and 12. According to some aspects, image encoder 520 comprises image encoder parameters stored in memory unit 510. According to some aspects, image encoder 520 is implemented as software stored in memory unit 510 and executable by processor unit 505, as firmware, as one or more hardware circuits, or as a combination thereof.

According to some aspects, image encoder 520 comprises one or more ANNs (such as a convolutional neural network) that are designed, configured, and/or trained to generate an image embedding based on an image. For example, in some cases, image encoder 520 encodes the second image to obtain an image embedding. In some cases, image encoder 520 encodes a training image to obtain an image embedding.

A CNN is a class of ANN that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During a training process, the filters may be modified so that they activate when they detect a particular feature within the input.

Text encoder 525 is an example of, or includes aspects of, the corresponding element described with reference to FIG. 12. According to some aspects, text encoder 525 comprises text encoder parameters stored in memory unit 510. According to some aspects, text encoder 525 is implemented as software stored in memory unit 510 and executable by processor unit 505, as firmware, as one or more hardware circuits, or as a combination thereof.

According to some aspects, text encoder 525 comprises one or more ANNs (such as a recurrent neural network or a transformer) that are designed, configured, and/or trained to generate a text embedding based on text. For example, in some cases, text encoder 525 encodes a caption to obtain a text embedding.

A recurrent neural network (RNN) is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

In some cases, a transformer comprises one or more ANNs comprising attention mechanisms that enable the transformer to weigh an importance of different words or tokens within a sequence. A transformer can process entire sequences simultaneously in parallel, making the transformer highly efficient and allowing the transformer to capture long-range dependencies more effectively.

In some cases, a transformer comprises an encoder-decoder structure. In some cases, the encoder of the transformer processes an input sequence and encodes the input sequence into a set of high-dimensional representations. In some cases, the decoder of the transformer generates an output sequence based on the encoded representations and previously generated tokens. In some cases, the encoder and the decoder are composed of multiple layers of self-attention mechanisms and feed-forward ANNs.

In some cases, the self-attention mechanism allows the transformer to focus on different parts of an input sequence while computing representations for the input sequence. The self-attention mechanism can capture relationships between words of a sequence by assigning attention weights to each word based on a relevance to other words in the sequence, thereby enabling the transformer to model dependencies regardless of a distance between words.

An attention mechanism is a key component in some ANN architectures, particularly ANNs employed in natural language processing (NLP) and sequence-to-sequence tasks, that allows an ANN to focus on different parts of an input sequence when making predictions or generating output.

NLP refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. These models can express the relative probability of multiple answers.

Some sequence models (such as RNNs) process an input sequence sequentially, maintaining an internal hidden state that captures information from previous steps. However, this sequential processing can lead to difficulties in capturing long-range dependencies or attending to specific parts of the input sequence.

The attention mechanism addresses these difficulties by enabling an ANN to selectively focus on different parts of an input sequence, assigning varying degrees of importance or attention to each part. The attention mechanism achieves the selective focus by considering a relevance of each input element with respect to a current state of the ANN.

In some cases, an ANN employing an attention mechanism receives an input sequence and maintains its current state, which represents an understanding or context. For each element in the input sequence, the attention mechanism computes an attention score that indicates the importance or relevance of that element given the current state. The attention scores are transformed into attention weights through a normalization process, such as applying a softmax function. The attention weights represent the contribution of each input element to the overall attention. The attention weights are used to compute a weighted sum of the input elements, resulting in a context vector. The context vector represents the attended information or the part of the input sequence that the ANN considers most relevant for the current step. The context vector is combined with the current state of the ANN, providing additional information and influencing subsequent predictions or decisions of the ANN.

By incorporating an attention mechanism, an ANN can dynamically allocate attention to different parts of the input sequence, allowing the ANN to focus on relevant information and capture dependencies across longer distances.

According to some aspects, each of image encoder 520 and text encoder 525 are comprised in a multi-modal encoder, such as CLIP. Contrastive Language-Image Pre-Training (CLIP) is an ANN that is trained to efficiently learn visual concepts from natural language supervision.

CLIP can be instructed in natural language to perform a variety of classification benchmarks without directly optimizing for the benchmarks' performance, in a manner building on "zero-shot" or zero-data learning. CLIP can learn from unfiltered, highly varied, and highly noisy data, such as text paired with images found across the Internet, in a similar but more efficient manner to zero-shot learning, thus reducing the need for expensive and large labeled datasets.

A CLIP model can be applied to nearly arbitrary visual classification tasks so that the model may predict the likelihood of a text description being paired with a particular image, removing the need for users to design their own classifiers and the need for task-specific training data. For example, a CLIP model can be applied to a new task by inputting names of the task's visual concepts to the model's text encoder. The model can then output a linear classifier of CLIP's visual representations.

Adapter network 530 is an example of, or includes aspects of, the corresponding element described with reference to FIGS. 8 and 12. According to some aspects, adapter network 530 comprises adapter network parameters stored in memory unit 510. According to some aspects, adapter network 530 is implemented as software stored in memory unit 510 and executable by processor unit 505, as firmware, as one or more hardware circuits, or as a combination thereof.

According to some aspects, adapter network 530 comprises one or more ANNs that are designed, configured, and/or trained to generate a descriptive embedding based on an image embedding. In some cases, adapter network 530 generates a training embedding based on a second image embedding. According to some aspects, adapter network 530 is trained to generate a descriptive embedding based on an image. In some aspects, adapter network 530 includes a convolutional layer, an attention block, and a multilayer perceptron.

A multilayer perceptron (MLP) is a feed-forward ANN that typically includes multiple layers of perceptrons. Each component perceptron layer may include an input layer, one or more hidden layers, and an output layer. Each node of an MLP may include a nonlinear activation function. An MLP may be trained using backpropagation (i.e., computing the gradient of the loss function with respect to the parameters).

Image generation model 535 is an example of, or includes aspects of, the corresponding element described with reference to FIG. 8. According to some aspects, image generation model 535 comprises image generation model parameters stored in memory unit 510. According to some aspects, image generation model 535 is implemented as software stored in memory unit 510 and executable by processor unit 505, as firmware, as one or more hardware circuits, or as a combination thereof.

According to some aspects, image generation model 535 comprises one or more ANNs that are designed, configured, and/or trained to generate an image based on one or more inputs. According to some aspects, image generation model 535 generates a composite image based on the descriptive embedding and the first image, where the composite image depicts the target element from the second image at the target location of the first image. In some examples, image generation model 535 iteratively removes at least a portion of the noise based on the mask to obtain the composite image.

According to some aspects, image generation model 535 generates a training composite image based on the training embedding using an image generation model 535.

In some aspects, image generation model 535 comprises a diffusion model. A diffusion model is a class of ANN that is trained to generate an image by learning an underlying probability distribution of the training data that allows the model to iteratively refine the generated image using a series of diffusion steps. In some cases, a reverse diffusion process of the diffusion model starts with a noise vector or a randomly initialized image. In each diffusion step of the reverse diffusion process, the model applies a sequence of transformations (such as convolutions, up-sampling, down-sampling, and non-linear activations) to the image, gradually "diffusing" the original noise or image to resemble a real sample. During the reverse diffusion process, the diffusion model estimates the conditional distribution of the next image given the current image (for example, using a CNN, a U-Net, or a similar architecture).

According to some aspects, object detection network 540 comprises object detection network parameters stored in memory unit 510. According to some aspects, object detection network 540 is implemented as software stored in memory unit 510 and executable by processor unit 505, as firmware, as one or more hardware circuits, or as a combination thereof. According to some aspects, object detection network 540 is implemented in a separate apparatus from image generation apparatus 500. According to some aspects, object detection network 540 is omitted from image generation apparatus 500.

According to some aspects, object detection network 540 comprises one or more ANNs (such as a CNN) that are trained, designed, and/or configured to detect an object included in an image.

In some cases, object detection network 40 is implemented as a Faster R-CNN (region-based convolutional neural network). A Faster R-CNN is an object detection algorithm that combines deep learning with region proposal methods.

A Faster R-CNN can comprise a CNN backbone, a region proposal network (RPN), and a region-based classifier. The CNN backbone may be a pre-trained network that extracts features from an input image. The backbone processes the image and produces a feature map that encodes the visual information.

The RPN operates on top of the feature map generated by the CNN backbone. The RPN is responsible for proposing potential object bounding box regions in the image. The RPN scans the feature map using sliding windows of different sizes and aspect ratios, predicting the probability of an object being present and adjusting the coordinates of the proposed bounding boxes. The RPN outputs a set of region proposals along with corresponding objectness scores. These proposals are then refined using non-maximum suppression (NMS) to filter-out highly overlapping bounding boxes and keeps the most confident ones.

The refined region proposals are fed into the region-based classifier. The region-based classifier uses ROI (Region of Interest) pooling or similar techniques to extract fixed-size feature vectors from each region proposal. The fixed-size feature vectors are then fed into a classifier, typically a fully connected network, to predict class labels and refine the bounding box coordinates for each proposed region.

During training, the Faster R-CNN is trained end-to-end using a multi-task loss function. This loss function combines a classification loss (e.g., a cross-entropy loss) and a bounding box regression loss (e.g., a smooth L1 loss) to jointly optimize the Faster R-CNN for accurate object classification and precise localization.

According to some aspects, mask network 545 comprises mask network parameters stored in memory unit 510. According to some aspects, mask network 545 is implemented as software stored in memory unit 510 and executable by processor unit 505, as firmware, as one or more hardware circuits, or as a combination thereof. According to some aspects, mask network 545 is implemented in a separate apparatus from image generation apparatus 500. According to some aspects, mask network 545 is omitted from image generation apparatus 500.

According to some aspects, mask network 545 comprises one or more ANNs (such as a Mask-R-CNN) that are designed, configured, and/or trained to obtain the mask indicating the target location of the first image.

A Mask R-CNN is a deep ANN that incorporates concepts of an R-CNN. A standard CNN may not be suitable when a length of an output layer is variable, i.e., when a number of objects of interest is not fixed. Selecting a large number of regions to analyze using conventional CNN techniques may result in computational inefficiencies. Thus, in an R-CNN approach, a finite number of proposed regions are selected and analyzed.

Given an image as input, the Mask R-CNN provides object bounding boxes, classes, and masks (i.e., sets of pixels corresponding to object shapes). A Mask R-CNN operates in two stages. First, the Mask R-CNN generates potential regions (i.e., bounding boxes) where an object might be found. Second, the Mask R-CNN identifies the class of the object, refines the bounding box and generates a pixel-level mask in pixel level of the object. These stages may be connected using a backbone structure such as a feature pyramid network (FPN).

Training component 550 is an example of, or includes aspects of, the corresponding element described with reference to FIG. 12. According to some aspects, training component 550 is implemented as software stored in memory unit 510 and executable by processor unit 505, as firmware, as one or more hardware circuits, or as a combination thereof.

In some cases, training component 550 is omitted from image generation apparatus 500 and included in a separate apparatus. where training component 550 communicates with image generation apparatus 500 to perform the training functions described herein. In some cases, training component 550 is implemented as software stored in a memory unit of the separate apparatus and executable by a processor unit of the separate apparatus, as firmware of the separate apparatus, as one or more hardware circuits of the separate apparatus, or as a combination thereof.

According to some aspects, training component 550 obtains training data including an image embedding for a training image and a text embedding for a caption describing the training image. In some examples, training component 550 trains, using the training data, adapter network 530 to generate a descriptive embedding of the training image based on the image embedding. In some aspects, the descriptive embedding has a same number of dimensions as the text embedding. In some examples, training component 550 computes a translation loss based on the descriptive embedding and the text embedding, where adapter network 530 is trained based on the translation loss in a first training phase.

In some examples, training component 550 obtains a second training image and a second image embedding for the second training image, where the second training image depicts a target element. In some examples, training component 550 computes an adapter loss based on the training composite image, where adapter network 530 is trained based on the adapter loss in a second training phase. In some aspects, image generation model 535 is frozen during the second training phase.

In some examples, training component 550 computes an image generation loss. In some examples, training component 550 fine-tunes image generation model 535 based on the image generation loss during a third training phase.

In some examples, training component 550 applies a first augmentation to the training image and a second augmentation to the second training image, where the image generation model 535 is fine-tuned based on the first augmentation and the second augmentation. In some examples, training component 550 extracts a portion of a ground-truth training image to obtain the second training image, where the adapter loss is computed based on the ground-truth training image.

According to some aspects, image generation model 535 is trained to generate a composite image based on the descriptive embedding and an additional image. In some aspects, the adapter network 530 is trained in a first phase independently of the image generation model 535. In some aspects, the adapter network 530 is trained in a second phase using the image generation model 535.

According to some aspects, user interface 555 provides for communication between a user device (such as the user device described with reference to FIG. 1) and image generation apparatus 500. For example, in some cases, user interface 555 is a graphical user interface (GUI) provided on the user device by image generation apparatus 500. In some cases, user interface 555 is omitted from image generation apparatus 500.

Figure 6:
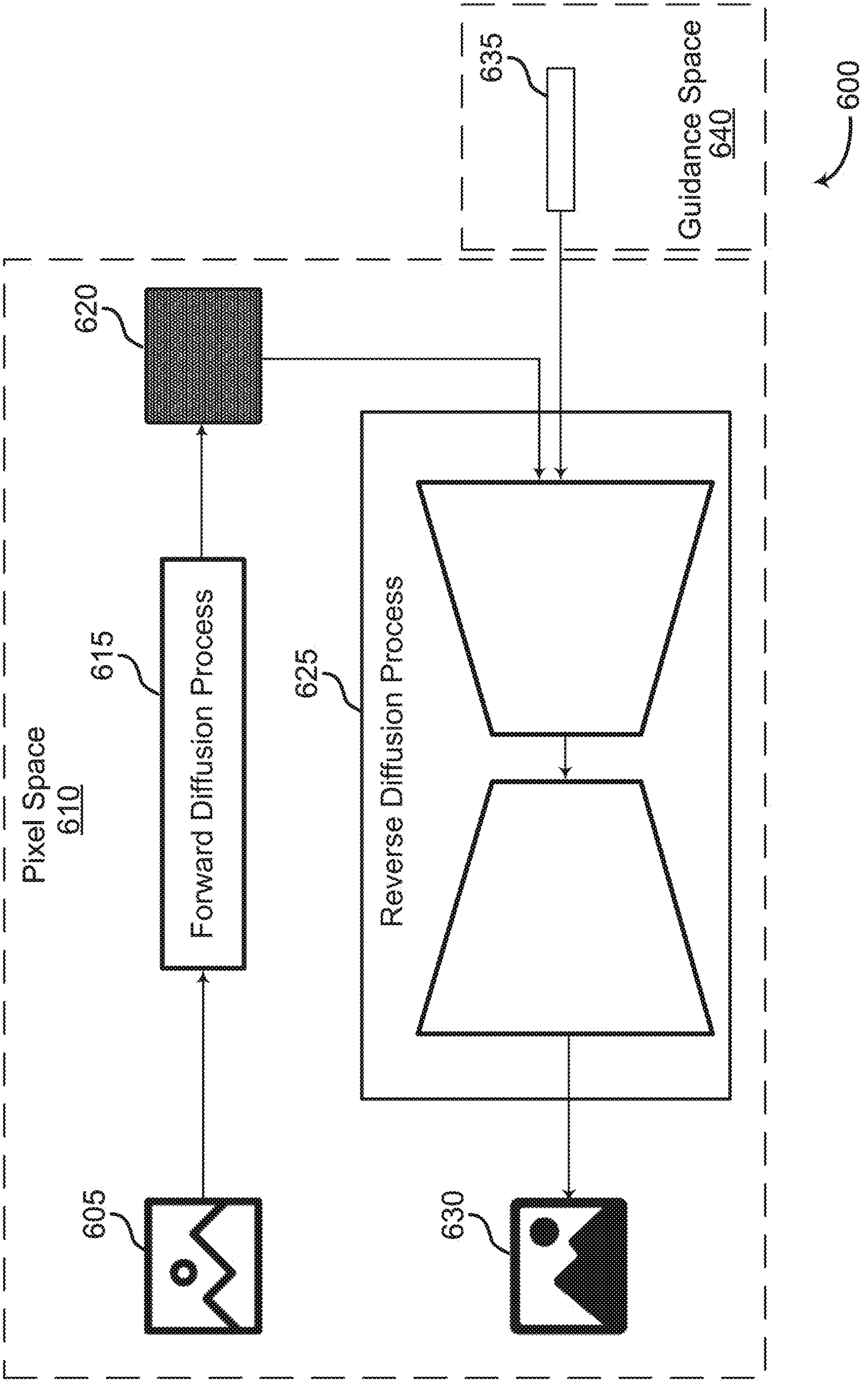
FIG. 6 shows an example of a guided diffusion architecture according to aspects of the present disclosure.

FIG. 6 shows an example of a guided diffusion architecture 600 according to aspects of the present disclosure. As shown in FIG. 6, an image generation model (such as the image generation model described with reference to FIGS. 5 and 8) can be implemented as a diffusion model.

Diffusion models are a class of generative ANNs that can be trained to generate new data with features similar to features found in training data. In particular, diffusion models can be used to generate novel images. Diffusion models can be used for various image generation tasks, including image super-resolution, generation of images with perceptual metrics, conditional generation (e.g., generation based on text guidance), image inpainting, and image manipulation.

Diffusion models function by iteratively adding noise to data during a forward diffusion process and then learning to recover the data by denoising the data during a reverse diffusion process. Examples of diffusion models include Denoising Diffusion Probabilistic Models (DDPMs) and Denoising Diffusion Implicit Models (DDIMs). In DDPMs, a generative process includes reversing a stochastic Markov diffusion process. On the other hand, DDIMs use a deterministic process so that a same input results in a same output. Diffusion models may also be characterized by whether noise is added to an image itself, as in pixel diffusion, or to image features generated by an encoder, as in latent diffusion.

Referring to FIG. 6, an image generation apparatus (such as the image generation apparatus described with reference to FIGS. 1, 5, 8, and 12) uses forward diffusion process 615 to gradually add noise to original image 605 (e.g., to a target location of a first image) in pixel space 610 to obtain noise images 620 at various noise levels. In some cases, forward diffusion process 615 is implemented as the forward diffusion process described with reference to FIG. 10 or 16. In some cases, for example in a training context, forward diffusion process 615 is implemented by a training component described with reference to FIGS. 5 and 12.

According to some aspects, the image generation model applies reverse diffusion process 625 to gradually remove the noise from noise images 620 at the various noise levels to obtain an output image 630 (e.g., a composite image). In some cases, reverse diffusion process 625 is implemented as the reverse diffusion process described with reference to FIG. 9 or 14. In some cases, reverse diffusion process 625 is implemented by a U-Net ANN comprised in the image generation model and described with reference to FIG. 7. In some cases, an output image (e.g., an intermediate image) is generated from each of the various noise levels. According to some aspects, a training component (such as the training component described with reference to FIGS. 5 and 12) compares the output image 630 to original image 605 to train reverse diffusion process 625.

According to some aspects, reverse diffusion process 625 is guided/conditioned based on guidance features 635 (such as a descriptive embedding described with reference to FIGS. 8 and 12). In some cases, the embedding space of the descriptive embedding is a guidance space 640. In some cases, reverse diffusion process 625 is also guided by a mask (such as the mask described with reference to FIG. 8) that describes an area of an image to be noised and denoised.

According to some aspects, guidance features 635 are combined with noise images 620 at one or more layers of reverse diffusion process 625 to ensure that output image 630 includes content described by guidance features 635. For example, guidance features 635 can be combined with noise images 620 using a cross-attention block within reverse diffusion process 625.

Cross-attention, also known as multi-head attention, is an extension of the attention mechanism used in some ANNs for NLP tasks. Cross-attention enables reverse diffusion process 625 to attend to multiple parts of an input sequence simultaneously, capturing interactions and dependencies between different elements. In cross-attention, there are typically two input sequences: a query sequence and a key-value sequence. The query sequence represents the elements that require attention, while the key-value sequence contains the elements to attend to. In some cases, to compute cross-attention, the cross-attention block transforms (for example, using linear projection) each element in the query sequence into a "query" representation, while the elements in the key-value sequence are transformed into "key" and "value" representations.

The cross-attention block calculates attention scores by measuring a similarity between each query representation and the key representations, where a higher similarity indicates that more attention is given to a key element. An attention score indicates an importance or relevance of each key element to a corresponding query element.

The cross-attention block then normalizes the attention scores to obtain attention weights (for example, using a softmax function), where the attention weights determine how much information from each value element is incorporated into the final attended representation. By attending to different parts of the key-value sequence simultaneously, the cross-attention block captures relationships and dependencies across the input sequences, allowing reverse diffusion process 625 to better understand the context and generate more accurate and contextually relevant outputs.

As shown in FIG. 6, guided diffusion architecture 600 is implemented according to a pixel diffusion model. In some embodiments, guided diffusion architecture 600 is implemented according to a latent diffusion model. In a latent diffusion model, an image encoder (such as the image encoder described with reference to FIG. 5) first encodes original image 605 as image features in a latent space. Then, forward diffusion process 615 adds noise to the image features, rather than original image 605, to obtain noisy image features. Reverse diffusion process 625 gradually removes noise from the noisy image features (in some cases, guided by guidance features 635) to obtain denoised image features. An image decoder of the image generation apparatus decodes the denoised image features to obtain output image 630 in pixel space 610. In some cases, as a size of image features in a latent space can be significantly smaller than a resolution of an image in a pixel space (e.g., 32, 64, etc. versus 256, 512, etc.), and therefore encoding original image 605 to obtain the image features can reduce inference time by a large amount.

Figure 7:
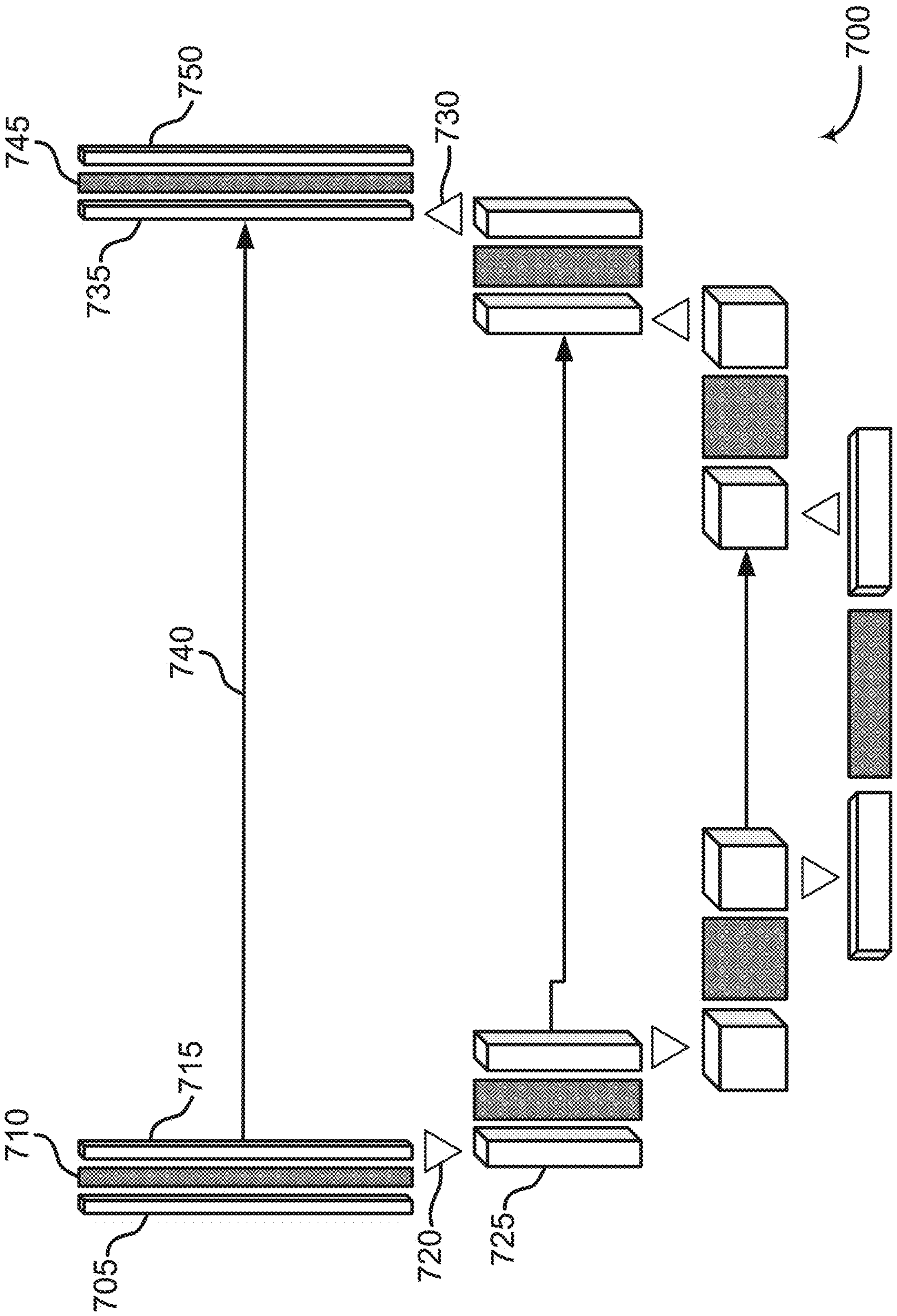
FIG. 7 shows an example of a U-Net architecture according to aspects of the present disclosure.

FIG. 7 shows an example of a U-Net 700 according to aspects of the present disclosure. According to some aspects, an image generation model (such as the image generation model described with reference to FIG. 5) comprises an ANN architecture known as a U-Net. In some cases, U-Net 700 implements the reverse diffusion process described with reference to FIGS. 6, 10, and/or 16.

According to some aspects, U-Net 700 receives input features 705, where input features 705 include an initial resolution and an initial number of channels, and processes input features 705 using an initial neural network layer 710 (e.g., a convolutional network layer) to produce intermediate features 715. In some cases, intermediate features 715 are then down-sampled using a down-sampling layer 720 such that down-sampled features 725 have a resolution less than the initial resolution and a number of channels greater than the initial number of channels.

In some cases, this process is repeated multiple times, and then the process is reversed. For example, down-sampled features 725 are up-sampled using up-sampling process 730 to obtain up-sampled features 735. In some cases, up-sampled features 735 are combined with intermediate features 715 having a same resolution and number of channels via skip connection 740. In some cases, the combination of intermediate features 715 and up-sampled features 735 are processed using final neural network layer 745 to produce output features 750. In some cases, output features 750 have the same resolution as the initial resolution and the same number of channels as the initial number of channels.

According to some aspects, U-Net 700 receives additional input features to produce a conditionally generated output. In some cases, the additional input features are combined with intermediate features 715 within U-Net 700 at one or more layers. For example, in some cases, a cross-attention module is used to combine the additional input features and intermediate features 715.

Figure 8:
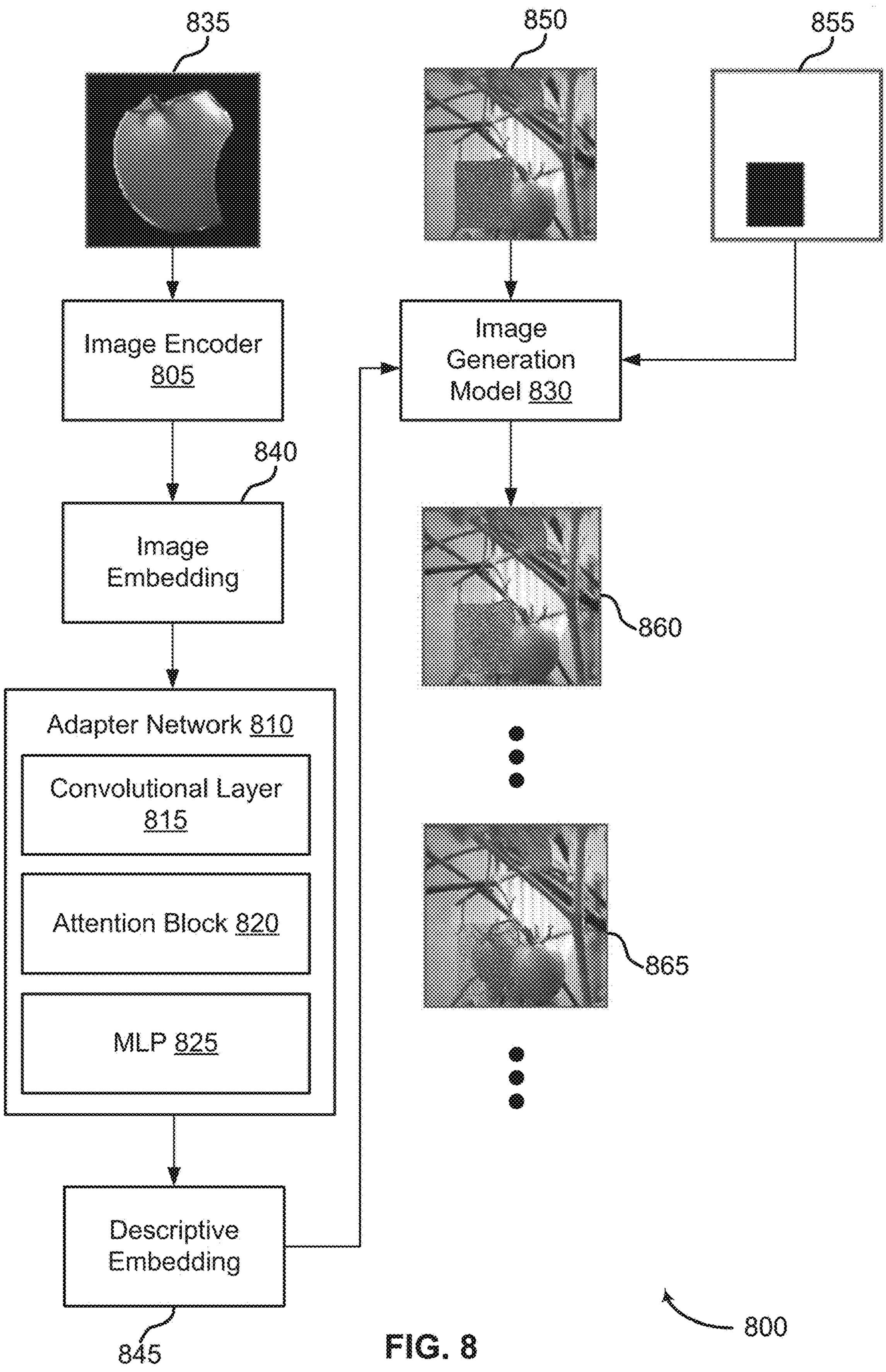
FIG. 8 shows an example of data flow in an image generation apparatus according to aspects of the present disclosure.

FIG. 8 shows an example of data flow in an image generation apparatus 800 according to aspects of the present disclosure. The example shown includes image generation apparatus 800, second image 835, image embedding 840, descriptive embedding 845, noised image 850, mask 855, first intermediate image 860, and second intermediate image 865. Image generation apparatus 800 is an example of, or includes aspects of, the corresponding element described with reference to FIGS. 1, 5, and 12.

According to some aspects, image generation apparatus 800 includes image encoder 805, adapter network 810, and image generation model 830. Image encoder 805 is an example of, or includes aspects of, the corresponding element described with reference to FIGS. 5 and 12. Adapter network 810 is an example of, or includes aspects of, the corresponding element described with reference to FIGS. 5 and 12.

According to some aspects, adapter network 810 includes convolutional layer 815, attention block 820, and multilayer perceptron 825. Image generation model 830 is an example of, or includes aspects of, the corresponding element described with reference to FIG. 5.

Second image 835 is an example of, or includes aspects of, the corresponding element described with reference to FIG. 4. Image embedding 840 is an example of, or includes aspects of, the corresponding element described with reference to FIG. 12. Descriptive embedding 845 is an example of, or includes aspects of, the corresponding element described with reference to FIG. 12.

Referring to FIG. 8, according to some aspects, given an input triplet ($I_O$, $I_{bg}$, M) that includes an object image $I_O \in \mathbb{R}^{H_s \times W_s \times 3}$ (e.g., second image 835 that includes a target element, or the object), a background image $I_{bg} \in \mathbb{R}^{H_t \times W_t \times 3}$ (e.g., an image including a target location for the object), and a binary mask $M \in \mathbb{R}^{H_t \times W_t \times 1}$ associated with background image $I_{bg}$, where the area corresponding to the target location is set to 1 and the area corresponding to the remainder of the background image $I_{bg}$ is set to 0 (e.g., mask 855), image generation model 830 composites the object into the masked area $I_{bg} \otimes M$ to obtain a composite image (such as the composite image described with reference to FIGS. 1-4).

In some cases, mask 855 can be considered as a soft constraint of the location and scale of a composited object in the composite image. In some cases, the composite image looks realistic and the appearance of the object is preserved in the composite image.

For example, in some cases, image encoder 805 encodes second image 835 to obtain image embedding 840 (e.g. image embedding $\tilde{E} \in \mathbb{R}^{k \times 257 \times 1024}$, where k is a batch size). In some cases, image encoder 805 provides image embedding 840 to adapter network 810.

In some cases, adapter network 810 is implemented as a sequence-to-sequence translator architecture that transforms a sequence of visual tokens to a sequence of text tokens to overcome a domain gap between image and text.

For example, in some cases, convolutional layer 815 (such as a one-dimensional convolutional layer) modifies a length of image embedding 840 to a length of a text embedding E used to train adapter network 810 (e.g., from 257 to 77). In some cases, attention block 820 bridges a gap between an image domain for image embedding 840 and a text domain for a text embedding by translating the length-modified image embedding to the text domain. In some cases, multilayer perceptron 825 modifies an embedding dimension of the translated embedding to an embedding dimension of a text embedding used to train the adapter network (e.g., from 1024 to 768).

Accordingly, adapter network 810 translates and modifies image embedding 840 to obtain descriptive embedding 845 (e.g., descriptive embedding $\hat{E}$) in a text domain, where descriptive embedding 845 captures fine-grained details of second image 835 provided by image embedding 840 that a text description of second image 835 could not, while providing an ease of use and quality in resulting output for image generation model 830 that image embedding 840 would not. In some cases, an adapter network is trained to obtain a descriptive embedding as described with reference to FIGS. 11-13.

According to some aspects, image generation apparatus 800 adds noise (for example, using a forward diffusion process described with reference to FIGS. 6 and 10) in a target location of a first image (such as a first image described with reference to FIGS. 1-2 and 4) to obtain noised image 850. In some cases, noised image 850 is a visual representation of noisy features obtained by adding noise to image features of a first image obtained from an image encoder (for example, as described with reference to FIG. 6). Likewise, in some cases, mask 855 is a visual representation of mask features obtained by encoding mask 855 using an image encoder. For ease of illustration and discussion, noised image 850 can also refer to noisy features corresponding to noised image 850, mask 855 can also refer to mask features corresponding to mask 855, and intermediate images (such as first intermediate image 860 and second intermediate image 865) can refer to intermediate features corresponding to the intermediate images.

In some cases, image generation model 830 receives descriptive embedding 845, noised image 850, and mask 855 as input. In some cases, image generation model 830 gradually denoises the noised region of noised image 850 in an iterative reverse diffusion process (such as the reverse diffusion process described with reference to FIGS. 6 and 10). In some cases, to condition the reverse diffusion process on descriptive embedding 845, image generation model 830 applies an attention mechanism as:

$$Softmax\left(\frac{(W_Q\hat{E}_x)(W_K\hat{E})^T}{\sqrt{d}}\right)W_V\hat{E} = AV \tag{1}$$

$\hat{E}_x$ is an intermediate representation of a denoising autoencoder (for example, implemented using a U-Net as described with reference to FIG. 7), Q, K, and V are query, key, and value representations, respectively, and $W_Q \in \mathbb{R}^{d \times d_x}$, $W_K \in \mathbb{R}^{d \times d_e}$, and $W_V \in \mathbb{R}^{d \times d_x}$ are embedding matrices.

In some cases, at each step of the reverse diffusion process, image generation model therefore outputs a partially denoised intermediate image (such as first intermediate image 860 and second intermediate image 865) until a final reverse diffusion step is performed and a fully denoised composite image is generated. In some cases, the composite image is output by the reverse diffusion process as composite image features, and a decoder of image generation apparatus decodes the composite image features to obtain the composite image.

In some cases, image generation model 830 adjusts the U-Net to use mask 855 for blending the background image $I_{bg}$ with an output image $I_{out}$ (e.g., an intermediate image) so that only a masked area $I_{out} \otimes M$ is denoised, thereby preserving an area outside the masked area in the composite image. In some cases, mask 855 is applied at every reverse diffusion step.

Image Generation

A method for image generation is described with reference to FIGS. 9-10. One or more aspects of the method include obtaining a first image and a second image, wherein the first image includes a target location and the second image includes a target element; encoding the second image using an image encoder to obtain an image embedding; generating a descriptive embedding based on the image embedding using an adapter network; and generating a composite image based on the descriptive embedding and the first image using an image generation model, wherein the composite image depicts the target element from the second image at the target location of the first image.

Some examples of the method further include obtaining a mask indicating the target location of the first image, wherein the composite image is generated based on the mask. Some examples of the method further include adding noise to the first image at the target location indicated by the mask. Some examples further include iteratively removing at least a portion of the noise based on the mask to obtain the composite image.

Some examples of the method further include providing the descriptive embedding of the second image as guidance to the image generation model for generating the composite image. In some aspects, the descriptive embedding comprises a same number of dimensions as a text embedding used to train the image generation model.

In some aspects, the adapter network is trained in a first phase independently of the image generation model. In some aspects, the adapter network is trained in a second phase using the image generation model.

Figure 9:
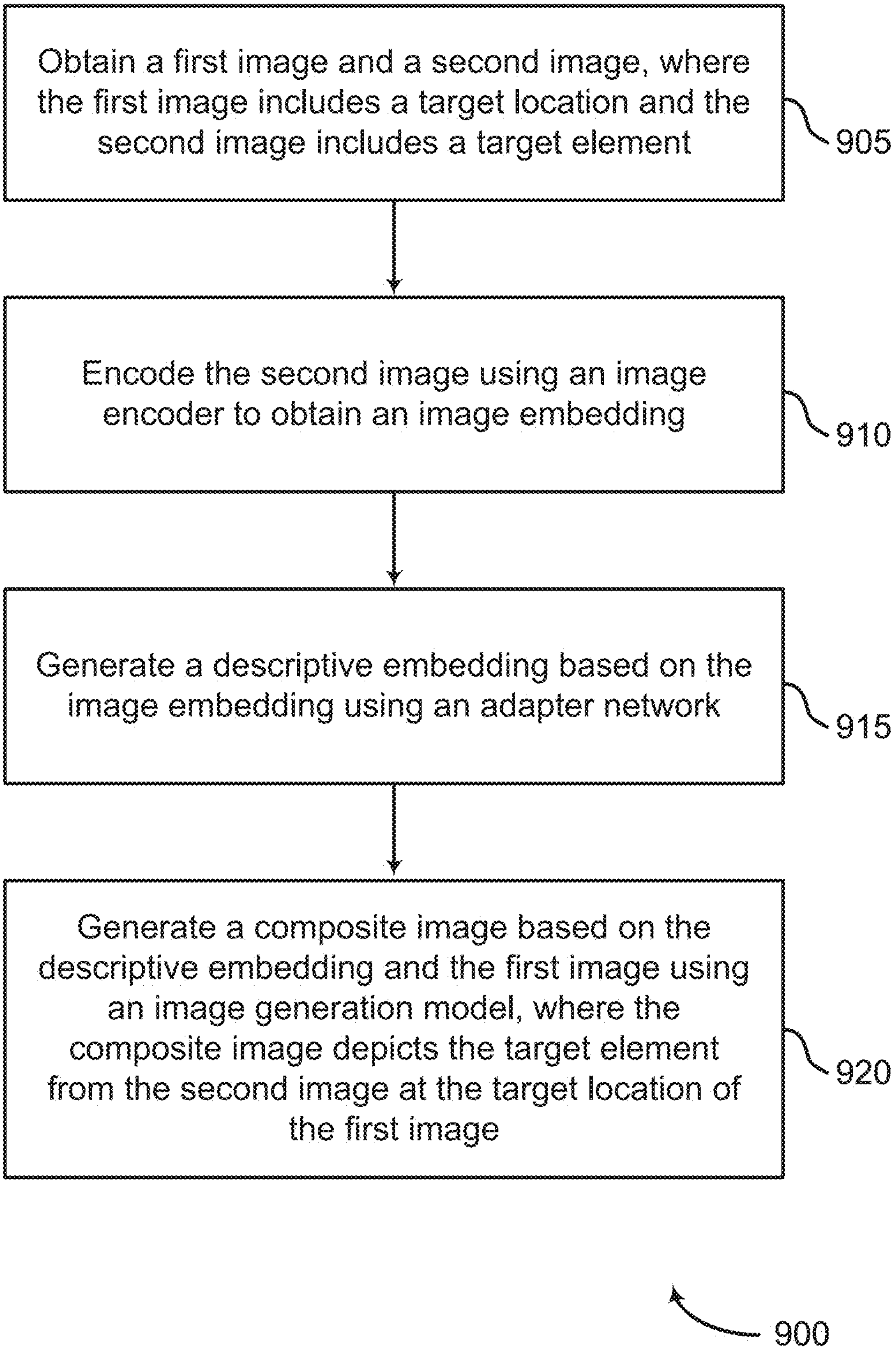
FIG. 9 shows an example of a method for generating a composite image according to aspects of the present disclosure.

FIG. 9 shows an example of a method 900 for generating a composite image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 9, an image generation apparatus (such as the image generation apparatus described with reference to FIGS. 1, 5, 8, and 12) generates a composite image based on a first image including a target location and a descriptive embedding of a second image including a target element using an image generation model, wherein the composite image depicts the target element from the second image at the target location of the first image.

In some cases, the image generation model is implemented as a diffusion model guided by the descriptive embedding. A comparative diffusion model might instead generate an image guided by a text description of an object to be inserted into an image, where the text description could be manually or automatically generated. However, the text description cannot be as fully descriptive of the object as the image of the object itself is, and an image embedding of the object image is less usable by a diffusion model as guidance than a text embedding, resulting in an unrealistic or visually unappealing image.

Therefore, in some cases, the descriptive embedding is generated based on an image embedding of the second image such that the descriptive embedding retains the information of the image embedding but in a text domain that is more usable by the image generation model, therefore resulting in a composite image that addresses geometry correction, harmonization, shadow generation, and view synthesis between the first image and the second image while preserving a similar appearance of the target element in the second image and in the composite image.

At operation 905, the system obtains a first image and a second image, where the first image includes a target location and the second image includes a target element. In some cases, the operations of this step refer to, or may be performed by, an image generation apparatus as described with reference to FIGS. 1, 5, 8, and 12.

In some cases, the user (such as the user described with reference to FIGS. 1 and 2) provides one or more of the first image and the second image to the image generation apparatus (for example, via a graphical user interface provided by the image generation apparatus on a user device, such as the user device described with reference to FIG. 1). In some cases, the image generation apparatus retrieves one or more of the first image and the second image from a database (such as the database described with reference to FIG. 1) or from another data source (such as the Internet). In some cases, the image generation apparatus retrieves the one or more of the first image and the second image in response to a user instruction (provided, for example, via the graphical user interface).

In some cases, the user includes the target location in the first image provided to the image generation apparatus (for example, via a bounding box included in the first image). In some cases, the user identifies the target location after providing the first image to the image generation apparatus (for example, via the graphical user interface). In some cases, the image generation apparatus selects the target location for the user based on a comparison of the first image and the second image (for example, in response to a user instruction).

In some cases, the image generation apparatus obtains a mask indicating the target location of the first image. In some cases, the user provides the mask. In some cases, the image generation apparatus generates the mask based on the target location and the first image. In some cases, the mask is a binary mask. In some cases, the mask is an example of the binary mask described with reference to FIG. 8. In some cases, the image generation apparatus obtains the mask based on the first image using a mask network, such as the mask network described with reference to FIG. 5.

In some cases, the image generation apparatus extracts the second image from another image including the target element and other elements (for example, using an object detection network such as the object detection network described with reference to FIG. 5). In some cases, the user provides the other image to the image generation apparatus, or the image generation apparatus retrieves the other image (for example, in response to a user instruction provided via the graphical user interface). In some cases, the image generation apparatus extracts the second image in response to a user selection of the target element in the other image.

At operation 910, the system encodes the second image using an image encoder to obtain an image embedding. In some cases, the operations of this step refer to, or may be performed by, an image encoder as described with reference to FIGS. 5, 8, and 12. In some cases, the image embedding is an example of, or includes aspects of, the corresponding element described with reference to FIGS. 8 and 12. In some cases, the image embedding is in an image domain.

At operation 915, the system generates a descriptive embedding based on the image embedding using an adapter network. In some cases, the operations of this step refer to, or may be performed by, an adapter network as described with reference to FIGS. 5, 8, and 12. In some cases, the descriptive embedding is an example of, or includes aspects of, the corresponding element described with reference to FIGS. 8 and 12. In some cases, as described with reference to FIG. 8, the descriptive embedding is a transformation of the image embedding to a text domain. For example, in some cases, the descriptive embedding comprises a same number of dimensions as a text embedding used to train the image generation model.

In some cases, the adapter network is trained in a first phase independently of the image generation model. In some cases, the adapter network is trained in a second phase using the image generation model.

At operation 920, the system generates a composite image based on the descriptive embedding and the first image using an image generation model, where the composite image depicts the target element from the second image at the target location of the first image. In some cases, the operations of this step refer to, or may be performed by, an image generation model as described with reference to FIGS. 5 and 8.

For example, in some cases, the image generation apparatus adds noise to the first image at the target location indicated by the mask (or to image features obtained by the image encoder and corresponding to the target location) as described with reference to FIGS. 6, 8, and 10. In some cases, the image generation model iteratively removes at least a portion of the noise based on the mask (or mask features obtained by the image encoder and corresponding to the mask) as described with reference to FIGS. 6, 8, and 10 to obtain the composite image as described with reference to FIGS. 6, 8, and 10.

In some cases, the image generation apparatus provides the descriptive embedding of the second image as guidance to the image generation model for generating the composite image, as described with reference to FIGS. 6, 8, and 10.

In some cases, the image generation apparatus provides the composite image to the user (for example, via the graphical user interface provided on the user device by the image generation apparatus).

Figure 10:
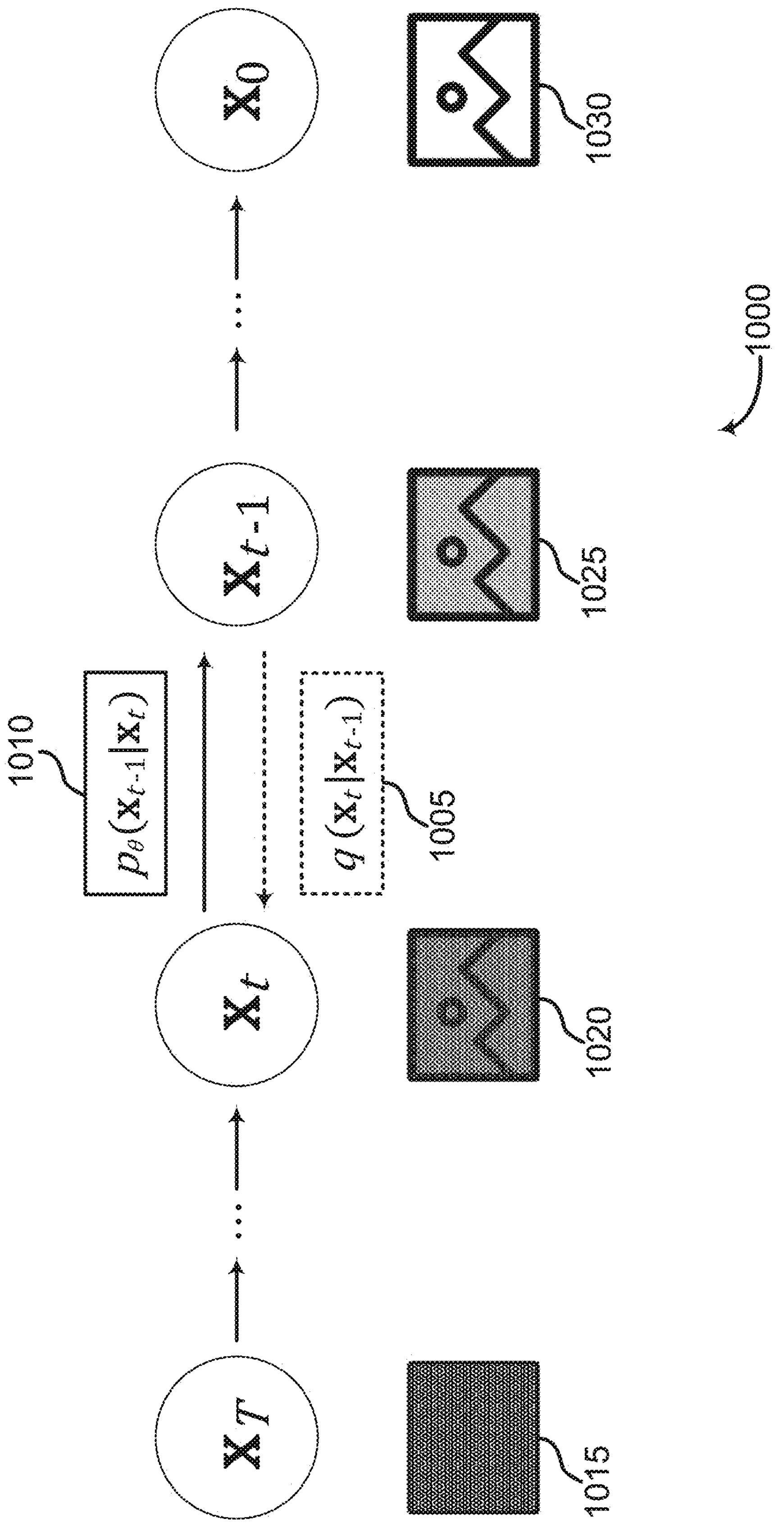
FIG. 10 shows an example of diffusion processes according to aspects of the present disclosure.

FIG. 10 shows an example of diffusion processes 1000 according to aspects of the present disclosure. The example shown includes forward diffusion process 1005 (such as the forward diffusion process described with reference to FIG. 6) and reverse diffusion process 1010 (such as the reverse diffusion process described with reference to FIG. 6). In some cases, forward diffusion process 1005 adds noise to an image (or image features in a latent space). In some cases, reverse diffusion process 1010 denoises the image (or image features in the latent space) to obtain a denoised image.

According to some aspects, an image generation apparatus (such as the image generation apparatus described with reference to FIGS. 1, 5, 8, and 12) uses forward diffusion process 1005 to iteratively add Gaussian noise to an input at each diffusion step t according to a known variance schedule $0<\beta_1<\beta_2< \ldots <\beta_T<1$:

$$q(x_t \mid x_{t-1}) = \mathcal{N}\left(x_t; \sqrt{1-\beta_t}\, x_{t-1}, \beta_t I\right) \tag{2}$$

According to some aspects, the Gaussian noise is drawn from a Gaussian distribution with mean $\mu_t=\sqrt{1-\beta_t}x_{t-1}$ and variance $\sigma^2=\beta_t\geq 1$ by sampling $\epsilon\sim\mathcal{N}(0, I)$ and setting $x_t=\sqrt{1-\beta_t}x_{t-1}+\beta_t\epsilon$. Accordingly, beginning with an initial input $x_0$, forward diffusion process 1005 produces $x_1, \ldots, x_t, \ldots x_T$, where $x_T$ is pure Gaussian noise.

In some cases, an observed variable $x_0$ (such as original image 1030) is mapped in either a pixel space or a latent space to intermediate variables $x_1, \ldots, x_T$ using a Markov chain, where the intermediate variables $x_1, \ldots, x_T$ have a same dimensionality as the observed variable $x_0$. In some cases, the Markov chain gradually adds Gaussian noise to the observed variable $x_0$ or to the intermediate variables $x_1, \ldots, x_T$, respectively, to obtain an approximate posterior $q(x_{1:T}|x_0)$.

According to some aspects, during reverse diffusion process 1010, an image generation model (such as the image generation model described with reference to FIGS. 5 and 8) gradually removes noise from $x_T$ to obtain a prediction of the observed variable $x_0$ (e.g., a representation of what the image generation model thinks the original image 1030 should be). In some cases, the prediction is influenced by a guidance prompt or a guidance vector (for example, a descriptive embedding described with reference to FIGS. 6, 8, and 12). A conditional distribution $p(x_{t-1}|x_t)$ of the observed variable $x_0$ is unknown to the image generation model, however, as calculating the conditional distribution would require a knowledge of a distribution of all possible images. Accordingly, the image generation model is trained to approximate (e.g., learn) a conditional probability distribution $p_\theta(x_{t-1}|x_t)$ of the conditional distribution $p(x_{t-1}|x_t)$:

$$p_\theta(x_{t-1} \mid x_t) = \mathcal{N}\left(x_{t-1}; \mu_\theta(x_t, t), \sum\nolimits_\theta (x_t, t)\right) \tag{3}$$

In some cases, a mean of the conditional probability distribution $p_\theta(x_{t-1}|x_t)$ is parameterized by $\mu_\theta$ and a variance of the conditional probability distribution $p_\theta(x_{t-1}|x_t)$ is parameterized by $\Sigma_\theta$. In some cases, the mean and the variance are conditioned on a noise level t (e.g., an amount of noise corresponding to a diffusion step t). According to some aspects, the image generation model is trained to learn the mean and/or the variance.

According to some aspects, the image generation model initiates reverse diffusion process 1010 with noisy data $x_T$ (such as noised image 1015). According to some aspects, the diffusion model iteratively denoises the noisy data $x_T$ to obtain the conditional probability distribution $p_\theta(x_{t-1}|x_t)$. For example, in some cases, at each step t−1 of reverse diffusion process 1010, the diffusion model takes $x_t$ (such as first intermediate image 1020) and t as input, where t represents a step in a sequence of transitions associated with different noise levels, and iteratively outputs a prediction of $x_{t-1}$ (such as second intermediate image 1025) until the noisy data $x_T$ is reverted to a prediction of the observed variable $x_0$ (e.g., a predicted image for original image 1030).

According to some aspects, a joint probability of a sequence of samples in the Markov chain is determined as a product of conditionals and a marginal probability:

$$x_T: p_\theta(x_{0:T}) := p(x_T)\prod_{t=1}^{T} p_\theta(x_{t-1} \mid x_t) \tag{4}$$

In some cases, $p(x_T)=\mathcal{N}(x_T; 0, I)$ is a pure noise distribution, as reverse diffusion process 1010 takes an outcome of forward diffusion process 1005 (e.g., a sample of pure noise $x_T$) as input, and $$\prod_{t=1}^{T} p_\theta(x_{t-1} \mid x_t)$$

represents a sequence of Gaussian transitions corresponding to a sequence of addition of Gaussian noise to a sample.

Training

A method for image generation is described with reference to FIGS. 11-16. One or more aspects of the method include obtaining training data including an image embedding for a training image and a text embedding for a caption describing the training image and training, using the training data, an adapter network of a machine learning model to generate a descriptive embedding of the training image based on the image embedding. In some aspects, the descriptive embedding has a same number of dimensions as the text embedding.

Some examples of the method further include encoding the training image using an image encoder to obtain the image embedding. Some examples further include encoding the caption using a text encoder to obtain the text embedding. Some examples of the method further include computing a translation loss based on the descriptive embedding and the text embedding, wherein the adapter network is trained based on the translation loss in a first training phase.

Some examples of the method further include obtaining a second training image and a second image embedding for the second training image, wherein the second training image depicts a target element. Some examples further include generating a training embedding based on the second image embedding. Some examples further include generating a training composite image based on the training embedding using an image generation model. Some examples further include computing an adapter loss based on the training composite image, wherein the adapter network is trained based on the adapter loss in a second training phase. In some aspects, the image generation model is frozen during the second training phase.

Some examples of the method further include computing an image generation loss. Some examples further include fine-tuning the image generation model based on the image generation loss during a third training phase. Some examples of the method further include applying a first augmentation to the training image and a second augmentation to the second training image, wherein the image generation model is fine-tuned based on the first augmentation and the second augmentation.

Some examples of the method further include extracting a portion of a ground-truth training image to obtain the second training image, wherein the adapter loss is computed based on the ground-truth training image.

Figure 11:
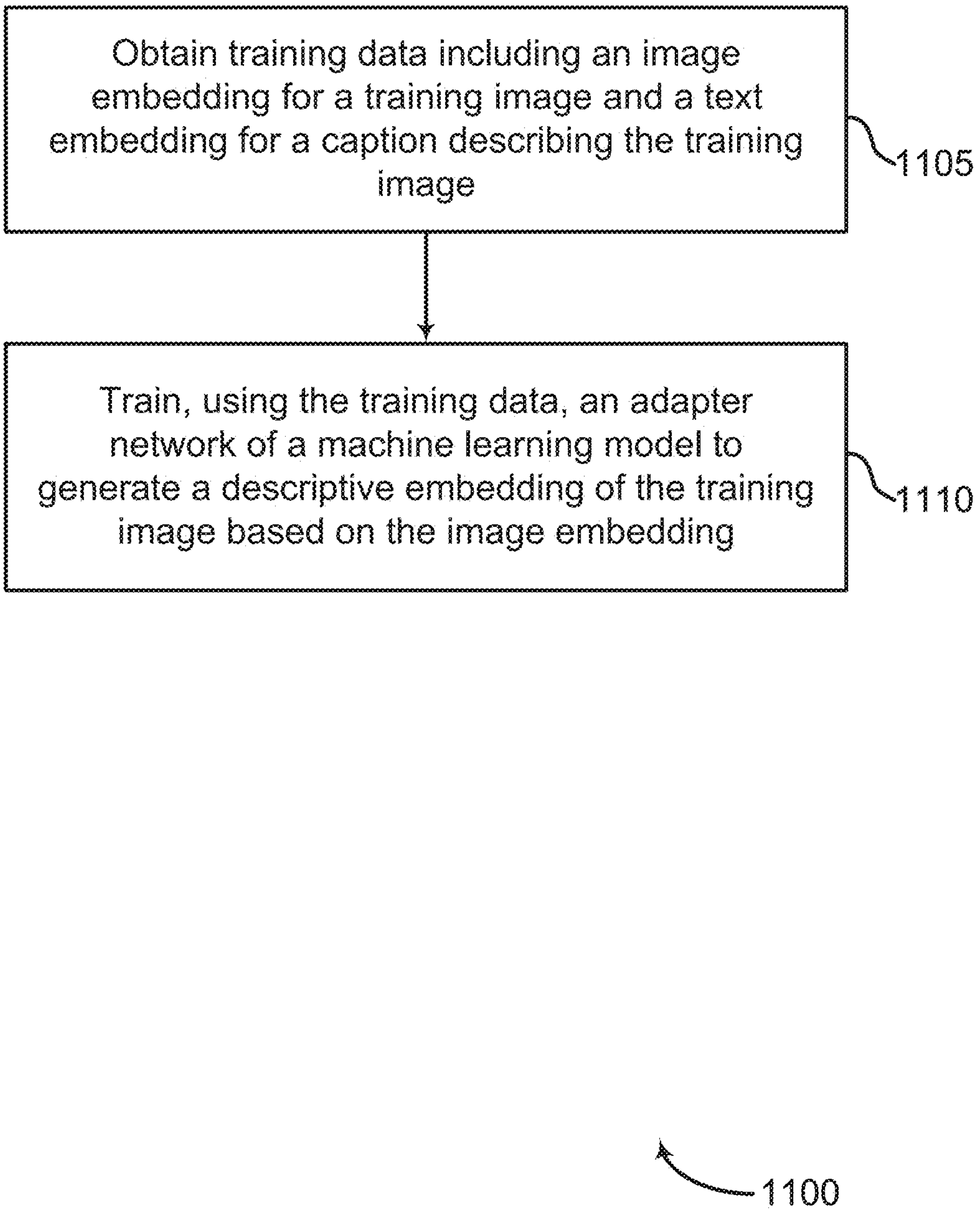
FIG. 11 shows an example of a method for training an adapter network according to aspects of the present disclosure.

FIG. 11 shows an example of a method 1100 for training an adapter network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 11, according to some aspects, an adapter network (such as the adapter network described with reference to FIGS. 5, 8, and 12) is trained to obtain a descriptive embedding (such as the descriptive embedding described with reference to FIGS. 8 and 12) based on an image embedding (such as the image embedding described with reference to FIGS. 8 and 12).

At operation 1105, the system obtains training data including an image embedding for a training image and a text embedding for a caption describing the training image. In some cases, the operations of this step refer to, or may be performed by, a training component as described with reference to FIGS. 5 and 12.

In some cases, a user (such as the user described with reference to FIG. 1) provides the training data to the training component (for example, via a graphical user interface provided by the image generation apparatus on a user device, such as the user device described with reference to FIG. 1). In some cases, the training component retrieves the training data from a database (such as the database described with reference to FIG. 1) or from another data source (such as the Internet). In some cases, the training component retrieves the training data in response to a user instruction (for example, provided via the graphical user interface).

In some cases, the user provides the training image and the caption to the training component. In some cases, the training component retrieves the training image and the caption from the database or the other data source. In some cases, the training component retrieves the training image and the caption in response to a user instruction. In some cases, an image encoder (such as the image encoder described with reference to FIGS. 5-6, 8, and 12) encodes the training image to obtain the image embedding. In some cases, a text encoder (such as the text encoder described with reference to FIGS. 5 and 12) encodes the caption to obtain the text embedding.

At operation 1110, the system trains, using the training data, an adapter network of a machine learning model to generate a descriptive embedding of the training image based on the image embedding. In some cases, the operations of this step refer to, or may be performed by, a training component as described with reference to FIGS. 5 and 12.

In some cases, the training component trains the adapter network using two training phases. In some cases, the training component trains the adapter network using a first training phase as described with reference to FIG. 12. In some cases, the training component trains (e.g., fine-tunes) the adapter network using a second training phase as described with reference to FIG. 13. In some cases, the training component trains an image generation model (such as the image generation model described with reference to FIGS. 5 and 8) using a third training phase as described with reference to FIGS. 15-16. In some cases, the descriptive embedding has a same number of dimensions as the text embedding.

Figure 12:
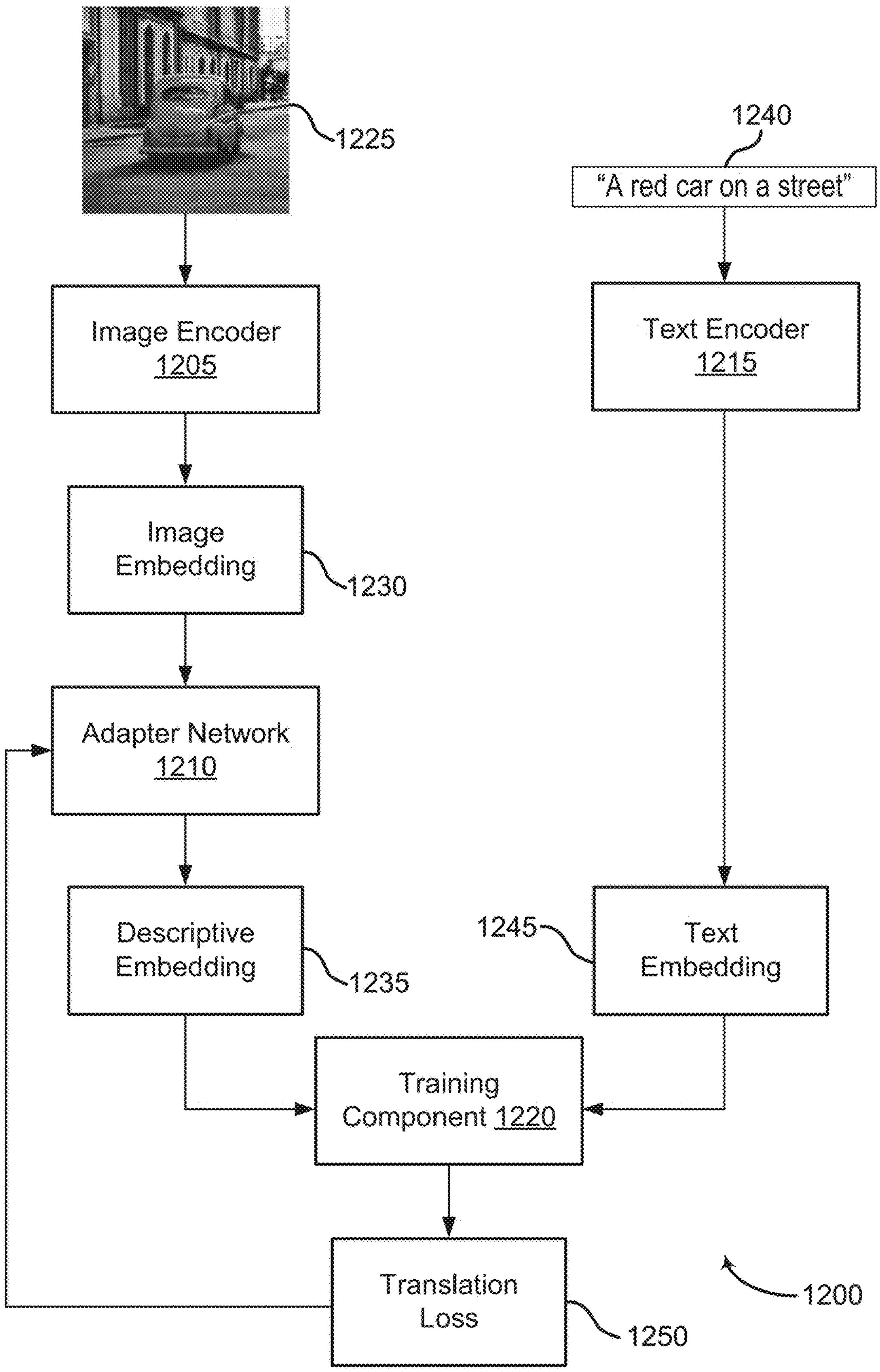
FIG. 12 shows an example of a first training phase according to aspects of the present disclosure.

FIG. 12 shows an example of a first training phase according to aspects of the present disclosure. The example shown includes image generation apparatus 1200, training image 1225, image embedding 1230, descriptive embedding 1235, caption 1240, text embedding 1245, and translation loss 1250. Image generation apparatus 1200 is an example of, or includes aspects of, the corresponding element described with reference to FIGS. 1, 5, and 8.

According to some aspects, image generation apparatus 1200 includes image encoder 1205, adapter network 1210, text encoder 1215, and training component 1220. Image encoder 1205 is an example of, or includes aspects of, the corresponding element described with reference to FIGS. 5 and 8. Adapter network 1210 is an example of, or includes aspects of, the corresponding element described with reference to FIGS. 5 and 8. Text encoder 1215 is an example of, or includes aspects of, the corresponding element described with reference to FIG. 5. Training component 1220 is an example of, or includes aspects of, the corresponding element described with reference to FIG. 5.

Training image 1225 is an example of, or includes aspects of, the corresponding element described with reference to FIG. 14. Image embedding 1230 is an example of, or includes aspects of, the corresponding element described with reference to FIG. 8. Descriptive embedding 1235 is an example of, or includes aspects of, the corresponding element described with reference to FIG. 8.

Referring to FIG. 12, in some cases, training component 1220 trains adapter network 1210 in a first stage of a training process based on translation loss 1250, which is obtained based on a comparison of descriptive embedding and text embedding 1245.

The term "loss function" refers to a function that impacts how a machine learning model is trained in a supervised learning model. For example, during each training iteration, the output of the machine learning model is compared to the known annotation information in the training data. The loss function provides a value (a "loss") for how close the predicted annotation data is to the actual annotation data. After computing the loss, the parameters of the model are updated accordingly and a new set of predictions are made during the next iteration.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

According to some aspects, training component 1220 provides training image 1225 to image encoder 1205, and image encoder 1205 encodes training image 1225 to obtain image embedding 1230. Adapter network 1210 generates descriptive embedding 1235 based on image embedding 1230 as described with reference to FIG. 8.

According to some aspects, training component 1220 provides caption 1240 describing training image 1225 to text encoder 1215. Text encoder 1215 encodes caption 1240 to obtain text embedding 1245 (e.g., a text embedding $E \in \mathbb{R}^{k \times 77 \times 768}$).

According to some aspects, training component 1220 computes translation loss 1250 based on descriptive embedding 1235 and text embedding 1245 according to a translation loss function:

$$\mathcal{L}_{trans} = \|\hat{E} - E\|_1 \tag{5}$$

According to some aspects, training component 1220 updates the adapter network parameters of adapter network 1210 according to translation loss 1250. According to some aspects, each of image encoder 1205 and text encoder 1215 are frozen while adapter network 1210 is trained.

Accordingly, in some cases, adapter network 1210 learns to generate a descriptive embedding that includes characteristics of both image embedding 1230 (such as high-level semantics) and text embedding 1245 (such as dimensions). In some cases, adapter network 1210 is fine-tuned in a second stage of a training process as described with reference to FIG. 13.

Figure 13:
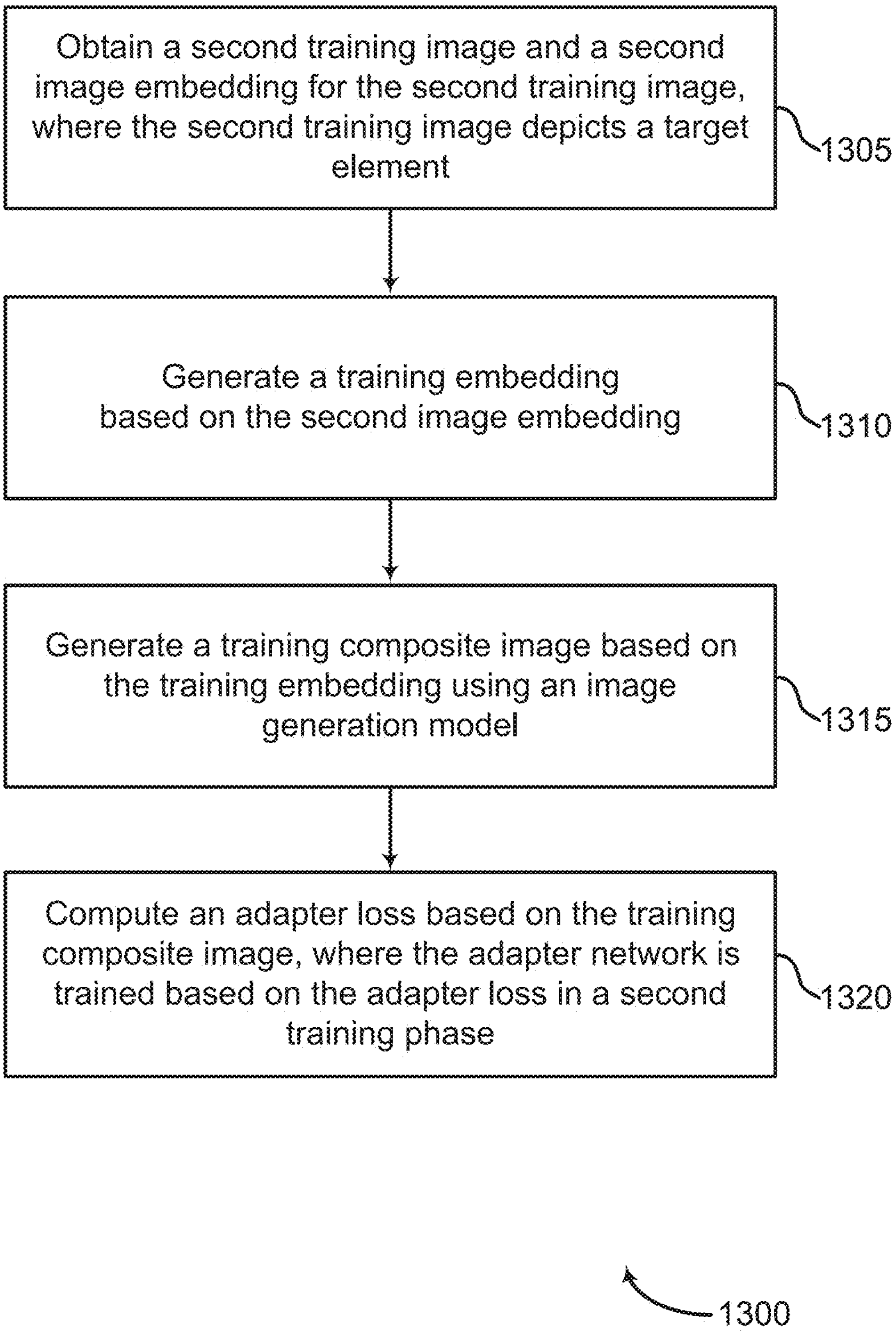
FIG. 13 shows an example of a method for training an adapter network using a second training phase according to aspects of the present disclosure.

FIG. 13 shows an example of a method 1300 for training an adapter network using a second training phase according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 13, in some cases, a training component (such as the training component described with reference to FIGS. 5 and 12) fine-tunes an adapter network (such as the adapter network described with reference to FIGS. 5, 8, and 12) during a second training phase such that the adapter network generates a descriptive embedding (such as the descriptive embedding described with reference to FIGS. 6, 8, and 12) that better describes texture details and or better preserves an appearance of a target element included in a training image. In some cases, an image generation model (such as the image generation model described with reference to FIGS. 5 and 8) is frozen during the second training phase.

At operation 1305, the system obtains a second training image and a second image embedding for the second training image, where the second training image depicts a target element. In some cases, the operations of this step refer to, or may be performed by, a training component as described with reference to FIGS. 5 and 12.

In some cases, a user (such as the user described with reference to FIG. 1) provides one or more of the second training image and the second image embedding to the training component (for example, via a graphical user interface provided by the image generation apparatus on a user device, such as the user device described with reference to FIG. 1). In some cases, the training component retrieves the one or more of the second training image and the second image embedding from a database (such as the database described with reference to FIG. 1) or from another data source (such as the Internet). In some cases, the training component retrieves the one or more of the second training image and the second image embedding in response to a user instruction (for example, provided via the graphical user interface).

In some cases, the training component provides the second training image to an image encoder (such as an image encoder described with reference to FIGS. 5-6, 8, and 12). In some cases, the image encoder encodes the second training image to generate the second image embedding. In some cases, the training component receives the second image embedding from the image encoder.

In some cases, the training image includes a target location and the second training image includes a target element. According to some aspects, the training component extracts a portion of a ground-truth training image to obtain the second training image. For example, in some cases, the training component obtains the second training image by extracting the second training image from the ground-truth training image to obtain training data that promotes a self-supervised training scheme, because the second training image is extracted from a ground truth training image and the extraction process is free of manual labeling.

Self-supervised machine learning is a subfield of machine learning where a model learns from unlabeled data to extract useful representations or features without explicit human labeling. In traditional supervised learning, models are trained on labeled data, where each data point is associated with a specific label or target value. However, labeled data can be expensive and time-consuming to obtain, especially in large quantities. Therefore, self-supervised learning can leverage an inherent structure or pattern within unlabeled data to learn meaningful representations.

In some cases, the user provides the ground-truth training image to the training component (for example, via the graphical user interface). In some cases, the training component retrieves the ground-truth training image from the database or the other data source. In some cases, the training component retrieves the ground-truth training image in response to a user instruction (for example, provided via the graphical user interface).

In some cases, training component uses an object detection network (such as the object detection network described with reference to FIG. 5) to detect one or more objects (e.g., target elements) included in the ground-truth training image to obtain a set of second training images, where each second training image respectively depicts a detected target element. In some cases, the training component removes a second training image from the training set of second images based on a size of a depicted object in the second training image. For example, the detected object may be too small or too large.

In some cases, the training component applies one or more augmentations (for example, a spatial perturbation or a color perturbation) to one or more of the second training images of the set of second training images to simulate a use-case scenario in which a target element input for the adapter network and a target location in a target image input for the adapter network have different scene geometry and lighting conditions. An example of the one or more augmentations is described in further detail with reference to FIG. 14.

According to some aspects, during the second training phase, the training component implements the ground-truth training image as training image including the target location and a corresponding second training image from the corresponding set of second training images as the second training image including the target element.

At operation 1310, the system generates a training embedding based on the second image embedding. In some cases, the operations of this step refer to, or may be performed by, an adapter network as described with reference to FIGS. 5, 8, and 12.

For example, in some cases, the adapter network receives the second image embedding as input and generates the training embedding based on the second image embedding. In some cases, the training embedding is a descriptive embedding as described with reference to FIGS. 6, 8, and 12.

At operation 1315, the system generates a training composite image based on the training embedding using an image generation model. In some cases, the operations of this step refer to, or may be performed by, an image generation model as described with reference to FIGS. 5 and 8.

For example, in some cases, the image generation model generates the training composite image based on the training embedding, the training image, and a mask for the training image using a reverse diffusion process as described with reference to FIGS. 6, 8, 10, and 16.

At operation 1320, the system computes an adapter loss based on the training composite image, where the adapter network is trained based on the adapter loss in the second training phase. In some cases, the operations of this step refer to, or may be performed by, a training component as described with reference to FIGS. 5 and 12.

For example, in some cases, the training component computes the adapter loss according to an adapter loss function:

$$\mathcal{L}_{adapt} = \mathbb{E}_{T,\epsilon\sim\mathcal{N}(0,1)}\left\|\epsilon - \epsilon_\theta\left(I_t \circ M, t, \hat{E}\right)\right\|_2^2 \tag{6}$$

T is the adapter network, $I_t$ is an image output by the image generation model at time t (e.g., an intermediate image or the training composite image), M is the mask, Ê is the training embedding, and $\epsilon_\theta$ is a reverse diffusion process.

In some cases, the training component determines the adapter loss by comparing the training composite image and the training image (e.g., the ground-truth training image). According to some aspects, the training component updates the adapter network parameters of the adapter network based on the adapter loss. In some cases, an attention block of the adapter network (such as the attention block described with reference to FIG. 8) is fine-tuned to remember more details from the target element of the second training image so that the training composite image more closely resembles the second training image.

According to some aspects, the training component updates the image generation model parameters of the image generation model during a third training phase as described with reference to FIGS. 15 and 16.

Figure 14:
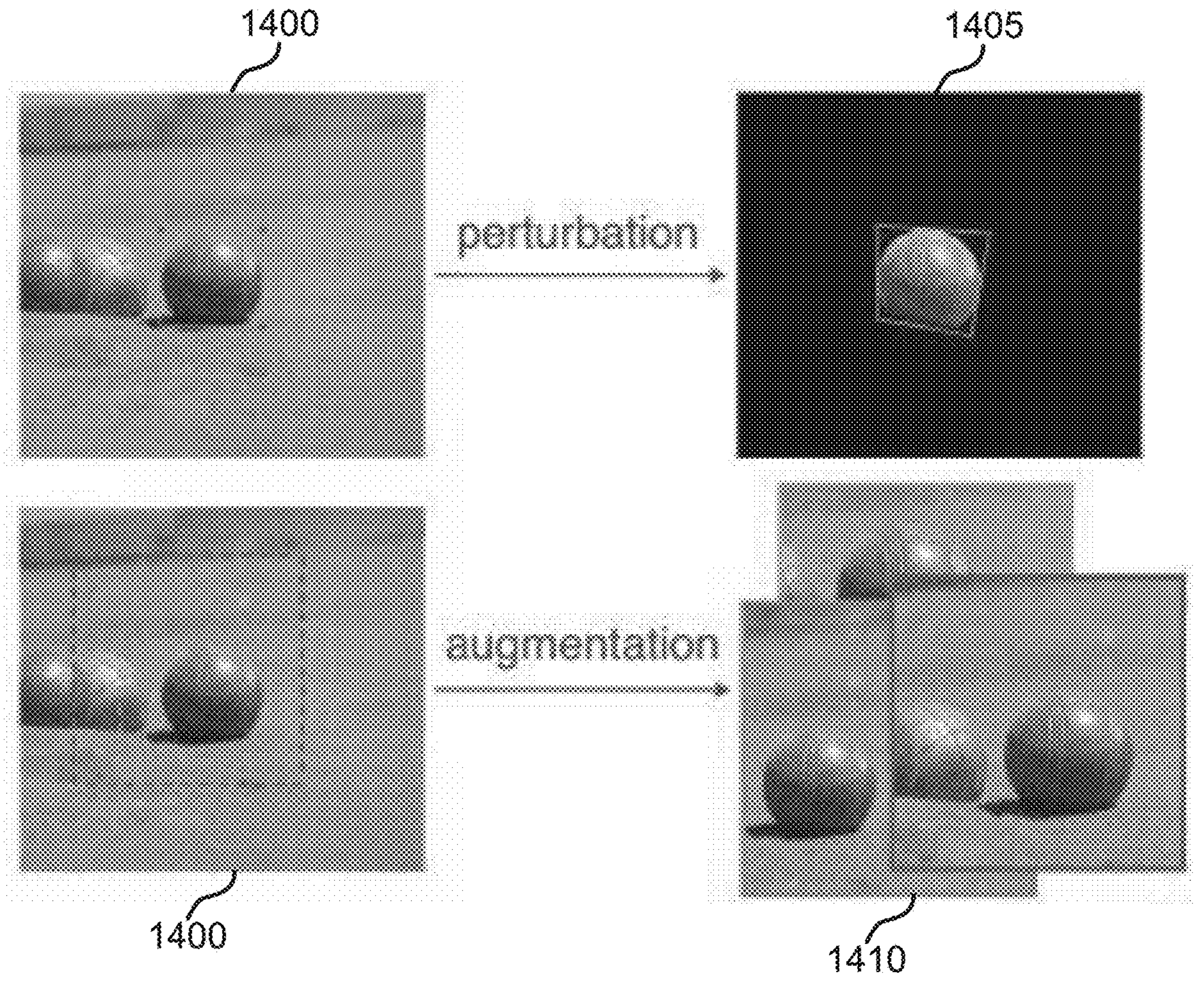
FIG. 14 shows an example of obtaining training data for a second training phase according to aspects of the present disclosure.

FIG. 14 shows an example of obtaining training data for a second training phase according to aspects of the present disclosure. The example shown includes ground-truth training image 1400, second training image 1405, and augmented training image 1410. Ground-truth training image is an example of, or includes aspects of, the corresponding element described with reference to FIG. 13.

FIG. 14 shows an example of one or more augmentations applied to second training image 1405 extracted from ground-truth training image 1400. In the example of FIG. 14, a training component (such as the training component described with reference to FIGS. 5 and 12) randomly perturbs the four points of an object bounding box included in second training image 1405 for an extracted target element to apply projective transformation, followed by a random rotation (e.g., within the range [−θ, θ], where θ=20°, and color perturbation.

In some cases, the training component uses a segmentation mask provided by a mask network (such as the mask network described with reference to FIG. 5) and augmented in a same manner as second training image 1405 to extract the target element from ground-truth training image 1400. In some cases, the bounding box is used as the mask because the bounding box covers the target element and extends to a neighboring area of the ground-truth training image, therefore providing room for shadow generation while being flexible enough for the image generation model to apply spatial transformations, synthesize novel views, and generate shadows and reflection.

Also shown in FIG. 14 is an example of one or more augmentations that can be applied by the training component to ground-truth training image 1400 during training (or to a first image including a target location during inference) to increase a realism of a training composite image generated as described with reference to FIGS. 13 and 15-16 (or a composite image generated as described with reference to FIGS. 9-10).

For ease of illustration, the example augmentation shown is applied to ground-truth training image 1400. In an example, the training component applies a crop and shift augmentation to ground-truth training image 1400 to obtain augmented training image 1410. In some cases, the training component performs a cropping augmentation on the ground-truth training image 1400 centered on the masked region of ground-truth training image 1400 so that the masked region is unchanged (for example, from a size of 512×512 to a smaller square patch), and then resizes the smaller square patch to the larger size (e.g., 512×512). In some cases, the augmentation is randomly applied. In some cases, augmented training image 1410 (or a similarly augmented image at inference) is resized to a smaller patch and pasted or stitched back to ground-truth training image 1400 (or the first image) as additional input.

Figure 15:
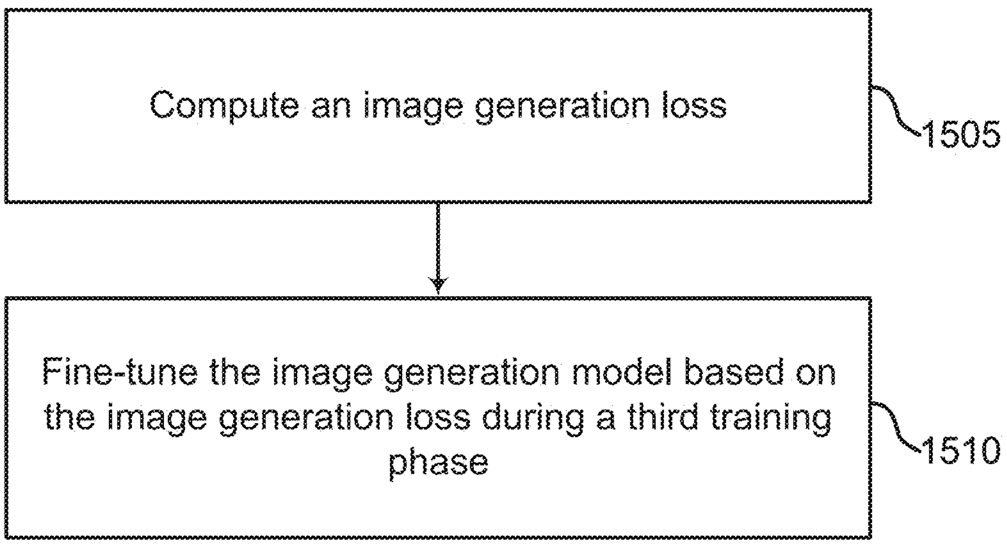
FIG. 15 shows an example of a method for fine-tuning an image generation model using a third training phase according to aspects of the present disclosure.

FIG. 15 shows an example of a method 1500 for fine-tuning an image generation model using a third training phase according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 15, in some cases, a training component (such as the training component described with reference to FIGS. 5 and 12) fine-tunes image generation model parameters of an image generation model (such as the image generation model described with reference to FIGS. 5 and 8) during a third training phase following the first training phase and the second training phase described with reference to FIGS. 11-14. In some cases, during the third training phrase, the training component freezes an adapter network (such as the adapter network described with reference to FIGS. 5, 8, and 12).

At operation 1505, the system computes an image generation loss. In some cases, the operations of this step refer to, or may be performed by, a training component as described with reference to FIGS. 5 and 12.

For example, in some cases, the training component computes the image generation loss according to an image generation loss function:

$$\mathcal{L}_{gen} = \mathbb{E}_{T,\epsilon\sim\mathcal{N}(0,1)}\left\|\epsilon - \epsilon_\theta\left(I_t \circ M, t, \hat{E}\right)\right\|_2^2 \tag{6}$$

T is the adapter network, $I_t$ is an image output by the image generation model at time t described with reference to FIG. 13, Ê is the training embedding described with reference to FIG. 13, and $\epsilon_\theta$ is a reverse diffusion process that is optimized. In some cases, the training component determines the adapter loss by comparing the training composite image and the training image (e.g., the ground-truth training image).

In some cases, during the third training phase, the training component applies one or more augmentations to the training image to increase a realism of the training composite image. The one or more augmentations are described in further detail with reference to FIG. 14.

At operation 1510, the system fine-tunes the image generation model based on the image generation loss during the third training phase. In some cases, the operations of this step refer to, or may be performed by, a training component as described with reference to FIGS. 5 and 12.

According to some aspects, the training component fine-tunes the image generation model based on the image generation loss as described with reference to FIG. 16.

Figure 16:
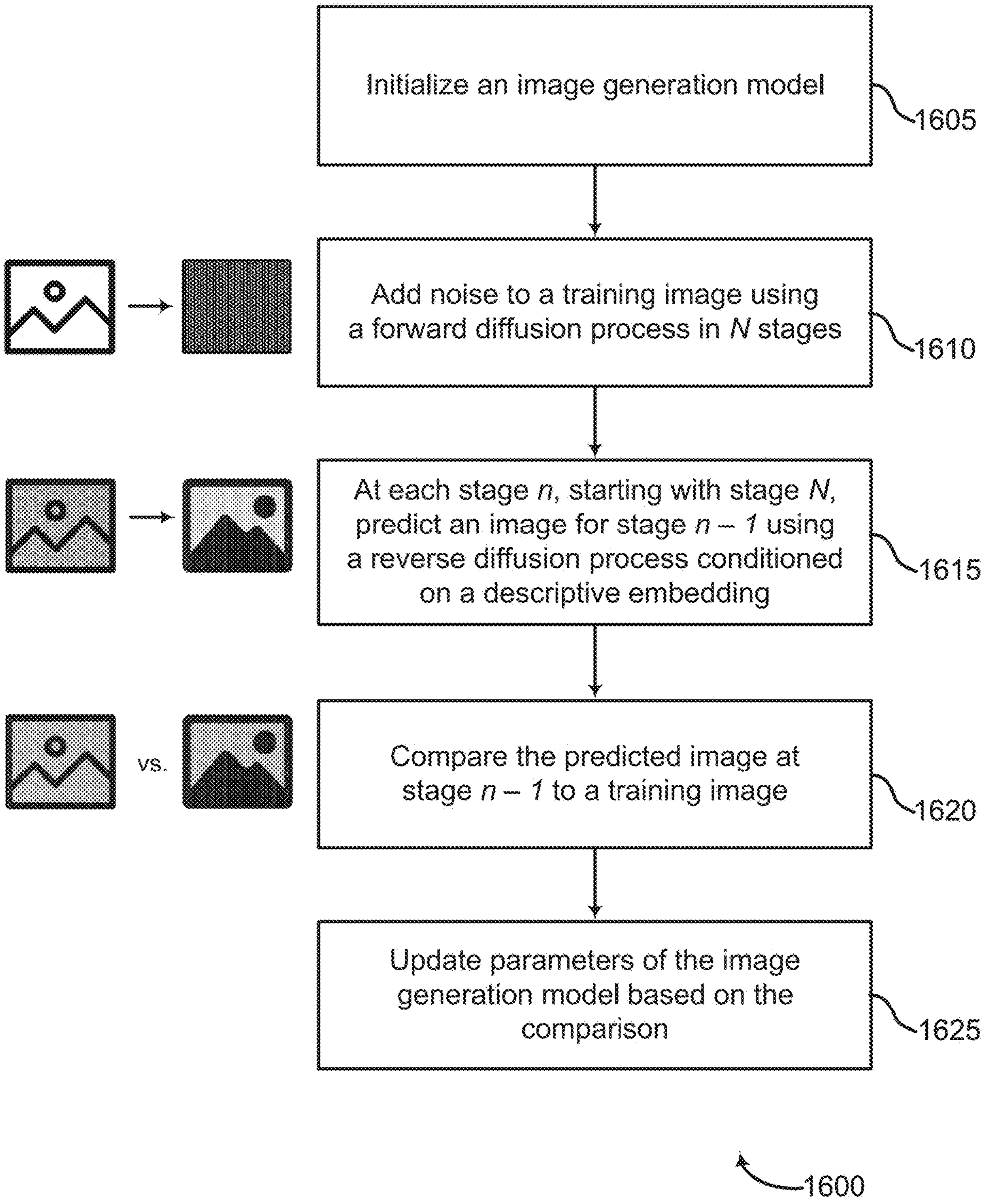
FIG. 16 shows an example of a method for updating parameters of an image generation model according to aspects of the present disclosure.

FIG. 16 shows an example of a method 1600 for training an image generation model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 16, an image generation system (such as the image generation system described with reference to FIG. 1) trains an image generation model to generate a composite image, where the image generation process of the image generation model is conditioned on a descriptive embedding.

At operation 1605, in some cases, the system initializes the image generation model. In some cases, the operations of this step refer to, or may be performed by, a training component as described with reference to FIGS. 5 and 12. In some cases, the initialization includes defining the architecture of the image generation model and establishing initial values for image generation parameters of the image generation model. In some cases, the training component initializes the image generation model to implement a U-Net architecture (such as the U-Net architecture described with reference to FIG. 7). In some cases, the initialization includes defining hyperparameters of the architecture of the image generation model, such as a number of layers, a resolution and channels of each layer block, a location of skip connections, and the like.

At operation 1610, the system adds noise to a target location of a training image (such as a training image described with reference to FIGS. 11-15) using a forward diffusion process in N stages. In some cases, the operations of this step refer to, or may be performed by, a training component as described with reference to FIGS. 5 and 12. In some cases, the training component adds noise to the training image using a forward diffusion process described with reference to FIG. 10.

At operation 1615, at each stage n, starting with stage N, the system predicts an image for stage n−1 using a reverse diffusion process conditioned on a training embedding (such as the training embedding described with reference to FIG. 13). In some cases, the operations of this step refer to, or may be performed by, the image generation model. According to some aspects, the image generation model performs a reverse diffusion process as described with reference to FIGS. 6 and 10, where each stage n corresponds to a diffusion step t, to predict noise that was added by the forward diffusion process.

At each stage, the image generation model predicts noise that can be removed from an intermediate image to obtain a predicted image that aligns with the guidance features (e.g., the training embedding). In some cases, an intermediate image is predicted at each stage of the training process.

At operation 1620, the system compares the predicted image at stage n−1 to an actual image (or image features), such as the image at stage n−1 or the original training image. In some cases, the operations of this step refer to, or may be performed by, a training component as described with reference to FIGS. 5 and 12. For example, in some cases, the training component determines the image generation loss described with reference to FIG. 15 based on the comparison.

At operation 1625, the system updates parameters of the image generation model based on the comparison. In some cases, the operations of this step refer to, or may be performed by, a training component as described with reference to FIGS. 5 and 12. For example, in some cases, the training component updates parameters of the U-Net according to the image generation loss using, e.g., gradient descent. In some cases, the training component trains the U-Net to learn time-dependent parameters of the Gaussian transitions.

Figure 17:
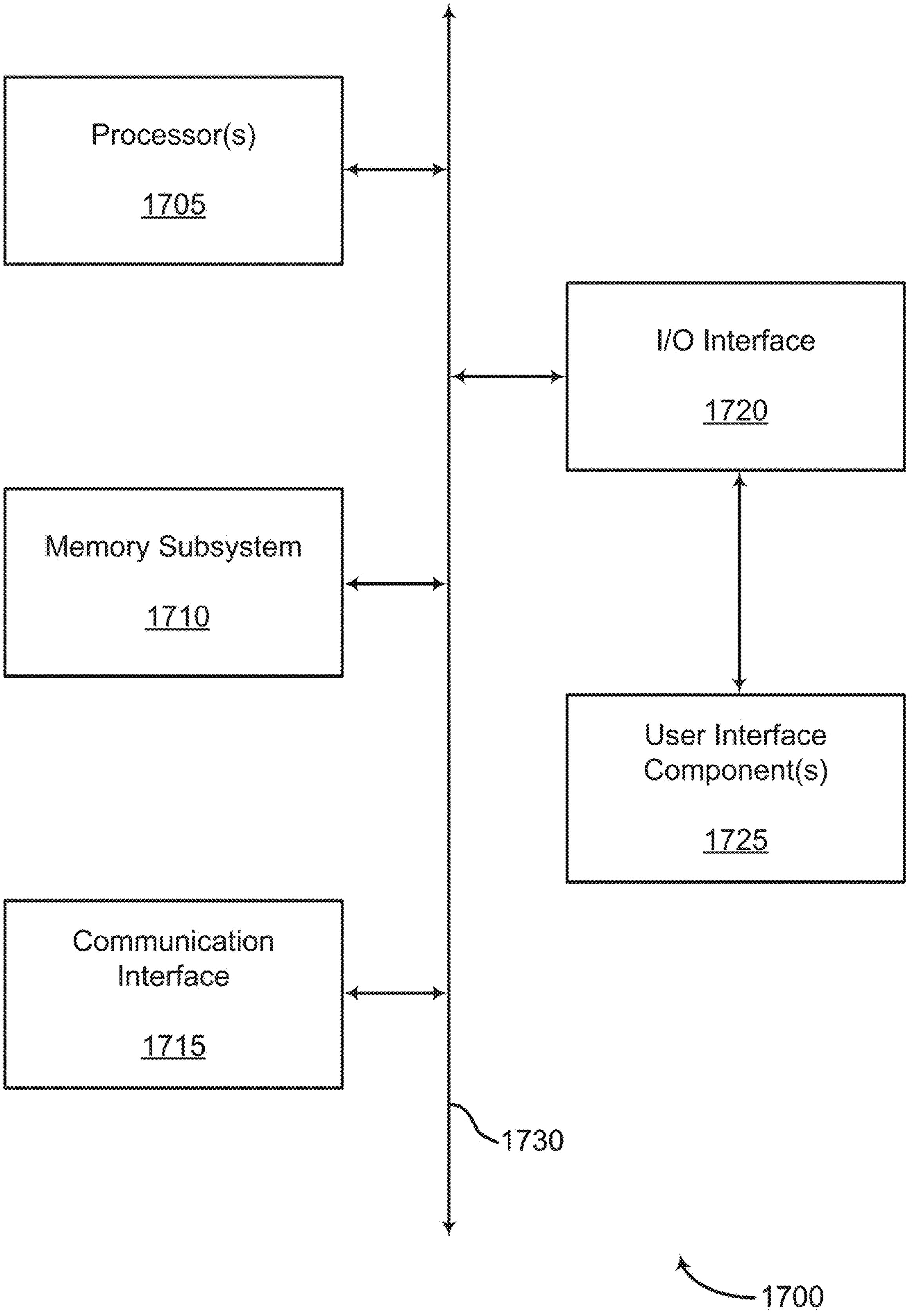
FIG. 17 shows an example of a computing device according to aspects of the present disclosure.

FIG. 17 shows an example of a computing device 1700 for multi-modal image editing according to aspects of the present disclosure. According to some aspects, computing device 1700 includes processor(s) 1705, memory subsystem 1710, communication interface 1715, I/O interface 1720, user interface component(s) 1725, and channel 1730.

In some embodiments, computing device 1700 is an example of, or includes aspects of, the image generation apparatus described with reference to FIGS. 1, 5, and 8, and 12. In some embodiments, computing device 1700 includes one or more processors 1705 that can execute instructions stored in memory subsystem 1710 to obtain a first image and a second image, wherein the first image includes a target location and the second image includes a target element; encode the second image using an image encoder to obtain an image embedding; generate a descriptive embedding based on the image embedding using an adapter network; and generate a composite image based on the descriptive embedding and the first image using an image generation model, wherein the composite image depicts the target element from the second image at the target location of the first image.

According to some aspects, computing device 1700 includes one or more processors 1705. Processor(s) 1705 are an example of, or includes aspects of, the processor unit as described with reference to FIG. 7. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 1710 includes one or more memory devices. Memory subsystem 1710 is an example of, or includes aspects of, the memory unit as described with reference to FIG. 5. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1715 operates at a boundary between communicating entities (such as computing device 1700, one or more user devices, a cloud, and one or more databases) and channel 1730 and can record and process communications. In some cases, communication interface 1715 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1720 is controlled by an I/O controller to manage input and output signals for computing device 1700. In some cases, I/O interface 1720 manages peripherals not integrated into computing device 1700. In some cases, I/O interface 1720 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1720 or via hardware components controlled by the I/O controller.

According to some aspects, user interface component(s) 1725 enable a user to interact with computing device 1700. In some cases, user interface component(s) 1725 include an audio device, such as an external speaker system, an external display device such as a display screen, an input device (e.g., a remote control device interfaced with a user interface directly or through the I/O controller), or a combination thereof. In some cases, user interface component(s) 1725 include a GUI.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image generation, comprising:

obtaining a first image and a second image, wherein the first image indicates a target location and the second image includes a target element;

encoding the second image using an image encoder to obtain an image embedding;

generating a descriptive embedding based on the image embedding using an adapter network by performing an attention process to translate the image embedding into a text domain; and generating, using an image generation model, a composite image by performing a denoising process based on the descriptive embedding and the first image, wherein the composite image depicts the target element from the second image at the target location of the first image.

2. The method of claim 1, further comprising:

obtaining a mask indicating the target location of the first image, wherein the composite image is generated based on the mask.

3. The method of claim 2, further comprising:

adding noise to the first image at the target location; and iteratively removing at least a portion of the noise based on the mask to obtain the composite image.

4. The method of claim 1, further comprising:

providing the descriptive embedding of the second image as guidance to the image generation model for generating the composite image.

5. The method of claim 1, wherein:

the descriptive embedding comprises a same number of dimensions as a text embedding used to train the image generation model.

6. The method of claim 1, wherein:

the adapter network is trained in a first phase independently of the image generation model.

7. The method of claim 6, wherein:

the adapter network is trained in a second phase using the image generation model.

8. A method for image generation, comprising:

obtaining training data by encoding, using an image encoder of a machine learning model, a training image to obtain an image embedding and encoding, using a text encoder of the machine learning model, a caption describing the training image to obtain a text embedding; and training, using the training data, an adapter network of the machine learning model to generate a descriptive embedding of the training image based on the image embedding, wherein training the adapter network comprises updating parameters of the adapter network based on a comparison of the descriptive embedding and the text embedding.

9. The method of claim 8, wherein:

the descriptive embedding has a same number of dimensions as the text embedding.

10. The method of claim 8, further comprising:

computing a translation loss based on the descriptive embedding and the text embedding, wherein the adapter network is trained based on the translation loss in a first training phase.

11. The method of claim 10, further comprising:

obtaining a second training image and a second image embedding for the second training image, wherein the second training image depicts a target element;

generating a training embedding based on the second image embedding;

generating a training composite image based on the training embedding using an image generation model; and computing an adapter loss based on the training composite image, wherein the adapter network is trained based on the adapter loss in a second training phase.

12. The method of claim 11, wherein:

the image generation model is frozen during the second training phase.

13. The method of claim 11, further comprising:

computing an image generation loss; and fine-tuning the image generation model based on the image generation loss during a third training phase.

14. The method of claim 13, further comprising:

applying a first augmentation to the training image and a second augmentation to the second training image, wherein the image generation model is fine-tuned based on the first augmentation and the second augmentation.

15. The method of claim 8, further comprising:

generating, using an image generation model, a composite image by performing a denoising process based on the descriptive embedding and a first image, wherein the composite image depicts a target element from a second image at a target location of the first image.

16. A system for image generation, comprising:

one or more processors;

one or more memory components coupled with the one or more processors;

an adapter network trained to generate a descriptive embedding based on an image by performing an attention process to translate an embedding of the image into a text embedding space; and an image generation model trained to generate a composite image by performing a denoising process based on the descriptive embedding and an additional image, wherein the additional image indicates a target location and the composite image depicts a target element from the image at the target location of the additional image.

17. The system of claim 16, wherein:

the adapter network comprises a convolutional layer, an attention block, and a multilayer perceptron.

18. The system of claim 16, wherein:

the image generation model comprises a diffusion model that is conditioned on the descriptive embedding.

19. The system of claim 16, further comprising:

an image encoder trained to generate the embedding of the image, wherein the adapter network is trained to generate the descriptive embedding based on the embedding of the image.

* * * * *